US007478576B2

(12) United States Patent
Rosheim

(10) Patent No.: US 7,478,576 B2
(45) Date of Patent: Jan. 20, 2009

(54) ROBOTIC MANIPULATOR

(75) Inventor: Mark E. Rosheim, Minneapolis, MN (US)

(73) Assignee: Ross-Hime Designs, Inc., Minneapolis, MN (US)

(*) Notice: Subject to any disclaimer, the term of this patent is extended or adjusted under 35 U.S.C. 154(b) by 483 days.

(21) Appl. No.: 11/391,765

(22) Filed: Mar. 22, 2006

(65) Prior Publication Data
US 2006/0213308 A1 Sep. 28, 2006

Related U.S. Application Data

(60) Provisional application No. 60/664,086, filed on Mar. 22, 2005.

(51) Int. Cl.
B25J 17/00 (2006.01)
B25J 17/02 (2006.01)
B25J 18/00 (2006.01)

(52) U.S. Cl. .............. 74/490.06; 74/490.03; 74/490.05; 74/490.01; 901/27; 901/28; 901/29

(58) Field of Classification Search . 74/490.01–490.06; 901/27–29, 15; 414/735
See application file for complete search history.

(56) References Cited

U.S. PATENT DOCUMENTS

| 125,880 | A | 4/1872 | Clemens |
|---|---|---|---|
| 2,988,904 | A | 6/1961 | Mazziotti |
| 3,075,386 | A | 1/1963 | Hulse |
| 3,477,249 | A | 11/1969 | Culver |
| 4,396,344 | A | 8/1983 | Sugimoto et al. |
| 4,651,589 | A | 3/1987 | Lambert |
| 4,674,947 | A | 6/1987 | Hamada et al. |
| 4,806,068 | A | 2/1989 | Kohli et al. |
| 4,819,496 | A | 4/1989 | Shelef |
| 4,976,582 | A | 12/1990 | Clavel |
| 5,284,000 | A | 2/1994 | Milne et al. |
| 5,333,514 | A | 8/1994 | Toyama et al. |
| 5,378,282 | A | 1/1995 | Pollard |
| 5,420,489 | A | 5/1995 | Hansen et al. |
| 5,556,242 | A | 9/1996 | Sheldon et al. |
| 5,656,905 | A | 8/1997 | Tsai |

(Continued)

OTHER PUBLICATIONS

"On the Development of the Agile Eye" by C. Gosselin et al., Dec. 1996.

(Continued)

*Primary Examiner*—Thu Nguyen
*Assistant Examiner*—Timothy J Murphy
(74) *Attorney, Agent, or Firm*—Kinney & Lange, P.A.

(57) ABSTRACT

A controlled relative motion system comprising a base support, a pivot holder and a plurality of pivoting links with the pivoting links rotatably coupled to both the base support and to members of the pivot holder to rotate about axes which extend in different directions for each of these rotatable couplings in a link, typically in accord with specific geometrical arrangements, and in different directions from similar axes in another of such links. The foregoing various rotatable couplings are provided by insertable bearings or bushings in the supports and links. The pivoting links have larger portions thereof outside of the interior of the manipulator parts of which can extend outside in different directions. Such systems can incorporate a variety of force imparting members to control movements of various ones of the pivoting links or pivot holder members.

23 Claims, 16 Drawing Sheets

U.S. PATENT DOCUMENTS

| | | | |
|---|---|---|---|
| 5,695,003 | A | 12/1997 | Ashton et al. |
| 5,699,695 | A | 12/1997 | Canfield et al. |
| 5,715,729 | A | 2/1998 | Toyama et al. |
| 5,771,747 | A | 6/1998 | Sheldon |
| 5,845,540 | A | 12/1998 | Rosheim |
| 5,865,063 | A | 2/1999 | Sheldon |
| 5,893,296 | A | 4/1999 | Rosheim |
| 5,967,580 | A | 10/1999 | Rosheim |
| 5,979,264 | A | 11/1999 | Rosheim |
| 6,105,455 | A | 8/2000 | Rosheim |
| 6,196,081 | B1 | 3/2001 | Yau |
| 6,418,811 | B1 | 7/2002 | Rosheim |
| 6,432,112 | B2 | 8/2002 | Brock et al. |
| 6,557,432 | B2 | 5/2003 | Rosheim |
| 2005/0199085 | A1* | 9/2005 | Isobe et al. .............. 74/490.05 |

OTHER PUBLICATIONS

Page 166 of *Machine Design*, Jun. 21, 1973.

Page 291 of *Mechanisms & Mechanical Devices Sourcebook*, by N. Chironis, entitled "Intertwining Links Produce True Constant-Motion Universal", 1991.

Pages 124 through 127, 162 and 163 from *Robot Wrist Actuators* by Mark E. Rosheim, 1989.

Cover page and pp. 90 and 92 from Dec. 1994 issue of *Discover* magazine.

Pages 131 through 133 from *Robot Evolution—The Development of Anthrobotics* by Mark E. Rosheim, 1994.

"Constant-Velocity Shaft Couplings" by K.H. Hunt, *Journal of Engineering for Industry*, May 1973.

*IEEE* publication " A Pantograph Linkage Parallel Platform Master Hand Controller for Force-Reflection", May 1992 by Gregory Long and Curtis Collins.

*IEEE* publication "HEXA: A Fast Six-DOF Fully-Parallel Robot", by Pierrot, Dauchez and Fournier, 1991 (Figure 4).

Publication "A Course-Fine Approach to Force-Reflecting Hand Controller Design", by Stocco and Salcudean. date Apr. 22, 1996 (Figures 6, 7 and 8).

*IEEE* publication "Kinetic Analysis of a Novel 6-DOF Parallel Manipulator", by Cleary and Brooks, (Figure 2), 1993.

*IEEE* publication " A New Analytical System Applying 6-DOF Parallel Line Manipulator for Evaluating Motion Sensation", Mimura and Funahashi, 1995.

* cited by examiner

ROBOTIC MANIPULATOR

CROSS-REFERENCE TO RELATED APPLICATION

This application claims the benefit of U.S. Patent Application No. 60/664,086, filed on Mar. 22, 2005.

BACKGROUND OF THE INVENTION

A strong desire for increased automation in the workplace, and a desire to increase the use of animated figures depicting animals, humans or other characters in entertainment and other situations, along with an increased ability to control such mechanical manipulators has led to substantial efforts in the development of robotics. As a result, significant advances have occurred in many aspects of robotics.

Perhaps the most widely used controlled component in robotic systems is a mechanical manipulator, that portion of a robot often used in connection with an end effect or to change the position or orientation of selected objects engaged by that manipulator. In many instances, such mechanical manipulators are desired to have capabilities similar to those of the human wrist or shoulder, that is, exhibiting two (or in some instances, more) degrees of freedom of motion.

Although a number of such mechanical manipulators have been developed which to a greater or lesser degree achieve some of these desires therefor, most have been relatively complicated devices requiring complicated components and difficult assembly procedures or both. Many, in addition, represent compromises in having relatively limited range, or singularities within the ranges, or other limitations in performance. Thus, there is a strong desire for a mechanical manipulator which can, under control of the user, position objects anywhere over at least a hemispherical surface without any singularities in the operation of the device in this range, and which can be made both reliably and inexpensively.

One such mechanical manipulator meeting this desire comprises a base support, a pivot holder and a plurality of pivoting links. The pivoting links are rotatably coupled to both the base support so as to be arrayed by rotational axis radially thereabout and to members of the pivot holder to rotate about axes which extend in different directions for each of these rotatable couplings in a link typically in accord with specific geometrical arrangements, and in different directions from similar axes in another of such links. The pivot holder is linked with a second plurality of pivoting links to a manipulable support. Such systems can incorporate a variety of force imparting members to control movements of various ones of the pivoting links or pivot holder members with as few as two being required. Pivot holder members having hinged portions with one portion rotatably connected to a first plurality pivoting link and the other portion rotatably connected to a second plurality pivoting link provides a capability for controlling the separation between the base and manipulable supports, but requires an actuator for each first plurality pivoting link and has its manipulable support positioned less precisely.

Another manipulable support meeting this desire comprises a base support, a pivot holder with hinged members and three pivoting links. The pivoting links are rotatably coupled to both the base support, but this time to be arrayed by axis more or less tangentially thereabout, and to members of the pivot holder to rotate about axes which extend in different directions for each of these rotatable couplings in a link typically in accord with specific geometrical arrangements, and in different directions from similar axes in another of such links. The pivot holder is linked with another three pivoting links to a manipulable support. Such systems can incorporate a variety of force imparting members to control movements of various ones of the pivoting links or pivot holder members with three being required.

This latter mechanical manipulator has a stronger construction than the former in having the three pivoting links connected to the base support with the rotation axis for each positioned tangentially thereto rather than being more or less cantilevered radially therefrom. However, there is much less vertical support provided to loads on the manipulable support positioned at relatively extreme angles with respect to vertical in some radial positions. In operation, the operation of any one actuator can not be controlled independently from the others because of the unavoidable coupling between the three pivoting links.

Still, such mechanical manipulators having only three pairs of pivoting links rotatably coupled to the pivot holder members have a further advantage in having fewer pivoting links therein as this can tend to reduce the possibilities of interference between manipulator components in the course of performing various manipulator motions directed by the actuators. This reduced opportunity for component interference during manipulator motions can allow the manipulable support, and any objects affixed thereto, to be positioned over a wider range of positions by the actuators or to provide a more compact manipulator, or both.

Yet, the reduced support provided to loads on a manipulable support in the manipulator, at least when positioned at relatively extreme angles with respect to vertical in some radial positions, remains a problem. This problem arises because the pivoting links, the rotary joints, the actuators, and even the transducers used in measuring certain variables in the manipulator during use for the manipulator control system, are compliant, or flexible, under applied loads. This yielding makes precision positioning of the manipulable support more difficult. The problem is further compounded by nonlinear effects such as joint backlash. Thus, there is a desire for a mechanical manipulator that is economical and strongly constructed to provide a wide range of output position including being capable of providing relatively good vertical support for output loads even at extreme angular positions.

BRIEF SUMMARY OF THE INVENTION

The present invention provides a controlled relative motion system comprising a base support, a pivot holder and a plurality of pivoting links. The pivoting links are rotatably coupled to both the base support and to members of the pivot holder to rotate about axes which extend in different directions for each of these rotatable couplings in a link typically in accord with specific geometrical arrangements, and in different directions from similar axes in another of such links. The pivot holder is rotatably coupled with a second plurality of pivoting links to a manipulable support. Such a manipulable support can be a part of, or support for, further such systems, or both. The foregoing various rotatable couplings are provided by insertable bearings or bushings in the supports and links affixing paired trunnions in openings. These systems can be supported on rotatable mounting arrangements at the base supports.

Such systems can incorporate a variety of force imparting members to control movements of various ones of the pivoting links or pivot holder members. Such members may be electric motors or other actuators, and may be connected to the system directly or through various drive trains and the like.

The pivoting links have larger portions thereof outside an intermediate plane therethrough with respect to the interior of the manipulator to thereby allow the positions of the base and manipulable supports to be closer to one another. Parts of such larger portions can extend both perpendicular to and parallel to the intermediate plane of such a pivoting link.

DETAILED DESCRIPTION

Figure 1:
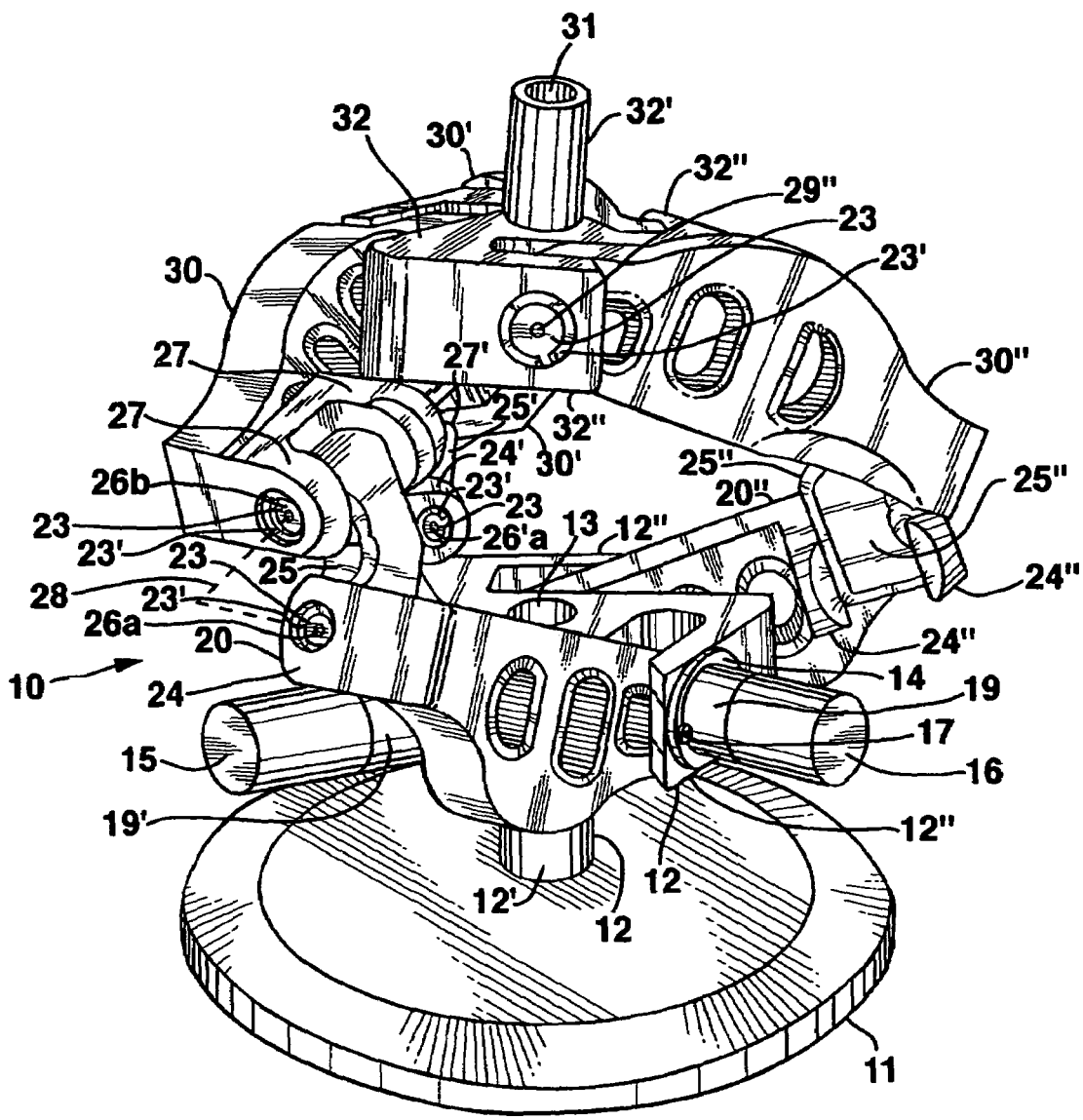
FIGS. 1 through 9 show perspective, plan, and fragmentary views of an embodiment of the present invention.
Figure 2:
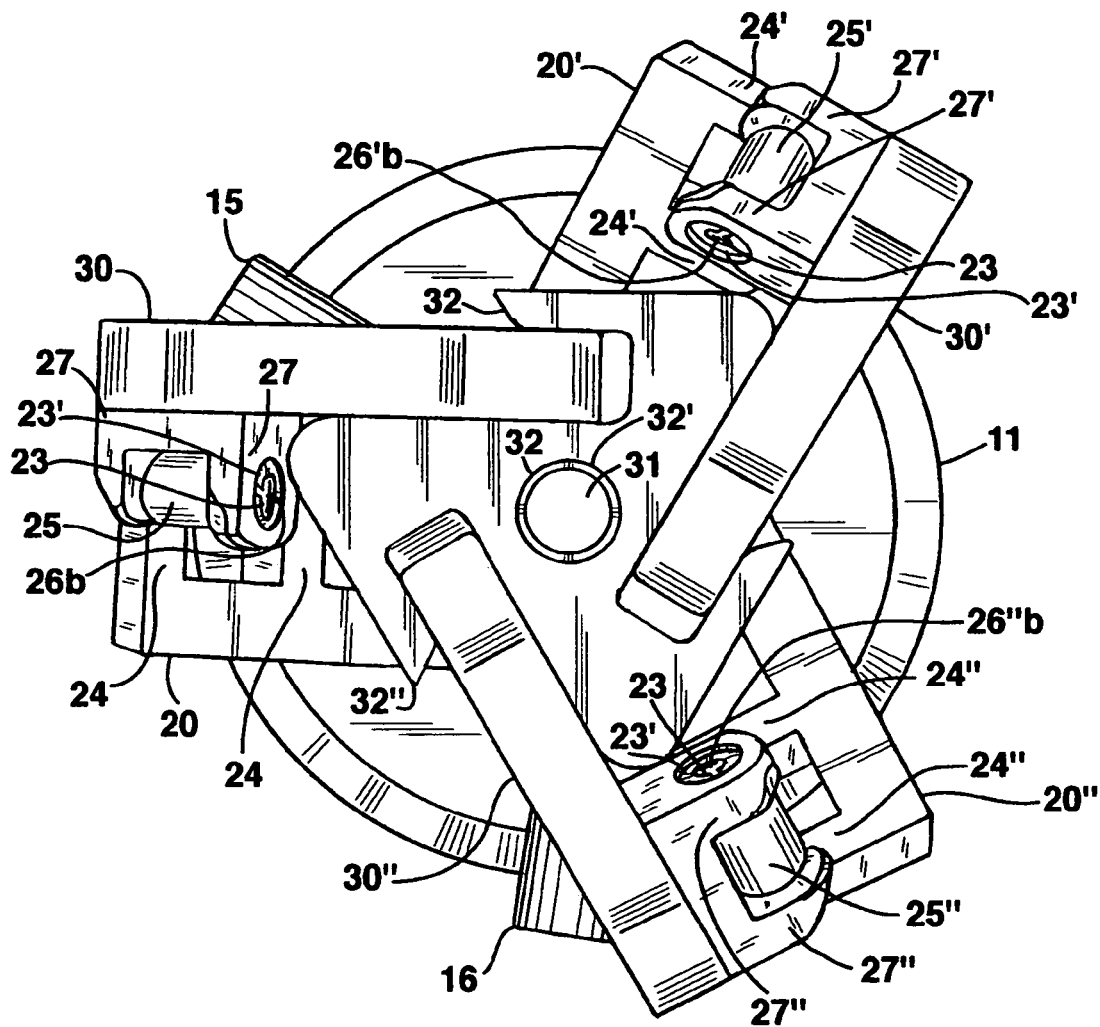

FIGS. 1 and 2 show a first embodiment of a mechanical manipulator, or controlled member motion system, 10, which can have a very large output operating range in various configurations over which it is free of singularities, and which is operated by various force imparting devices directly or through various kinds of drive trains. FIG. 1 shows an elevation view of manipulator 10 with FIG. 2 showing a top view thereof. Manipulator 10 is positioned on a mounting arrangement, 11, which can contain therein an electric motor arrangement, unseen in these figures, which can rotate mounting arrangement 11 in either the clockwise or counterclockwise direction as selected by the user to thereby carry the remainder of joint or manipulator 10 correspondingly with it in these directions.

Directly supported on mounting arrangement 11 is a base support, 12, shown as truncated cylindrical shell structure, 12', affixed at one end thereof on mounting arrangement 11 and fixedly supporting on the opposite end a base, 12". Base 12" has a triangular shaped central plate portion with three outlying partially spaced apart arms each primarily paralleling a corresponding triangular central plate portion side but with each such arm extending from a corresponding triangular central plate portion corner formed in part by that side. These arms, in each extending from such a corner, begin with the outer side thereof extending tangentially from another adjacent triangular central plate portion side which in part also forms that corner, and which then further extends in changed directions so as to form the primary extent thereof parallel to a corresponding triangular central plate portion side. However, different geometrical shapes can be used instead. Support 12 has an opening, 13, extending vertically in these figures. Opening 13 extends through support 12, including through base 12" and shell structure 12', and from there through mounting arrangement 11 along the axis about which it is capable of rotating manipulator 10 so as to be capable of permitting some desired means to extend therethrough such as electrical wiring, optical fibers or some mechanical arrangement, or some combination thereof.

A pair of mounting plates, 14, is provided each holding one of a pair of electric motors, 15 and 16, with screws, 17, to a corresponding arm of base 12" of manipulator 10 to serve as rotary actuators in directing positioning operations of that manipulator. This attachment arrangement for motor 16, including the motor drive connections, can be better seen in FIG. 3, which is a fragmentary view of the motor 16 region in each of FIGS. 1 and 2 with parts of this fragmentary view including base 12" shown in cross section (an essentially identical arrangement is used for motor 15). Electric motor 16 has a splined shaft, 18, extending from an included speed reduction gear assembly, 19, which assembly is in turn affixed to the rotor of that motor. This motor and attachment arrangement, in being directly affixed to an arm of base 12", has splined shaft 18 extending through an opening in that arm to engage a pivoting link, 20, through being positioned within the bore of an interiorly splined fitting at the end of the outer one of a pair of trunnions, 21, extending perpendicularly outward from opposite sides of pivoting link 20 so that the exterior splines of shaft 18 mate with the interior splines of that trunnion fitting.

Each member of trunnion pair 21 has a shoulder ring, 22, positioned about it that is also against the rest of pivoting link 20 to maintain symmetrical positioning of pivoting link 20 in the spacing provided by a slot between the arm of base 12" through which shaft 18 extends and the corresponding triangular shaped central plate portion thereof across from that arm. Trunnions 21 are each typically formed integrally with pivoting link 20 as is its corresponding shoulder ring 22 so that they are all formed out of the same piece of material. Trunnions pair 21 members are each mounted, respectively, in the openings in the corresponding one of (a) that arm of base 12" through which shaft 18 extends and (b) the triangular shaped central plate portion thereof across from that arm by a corresponding one of a pair of ball bearing assemblies, 23. The opening in the side of the corresponding triangular shaped central plate portion of base 12" across from that arm is accessible through a further opening extending thereto from either or both triangular faces of that base.

Ball bearing assemblies 23 are each retained in a corresponding one of (a) the opening in that arm of base 12" through which shaft 18 extends and (b) the opening in the triangular shaped central plate portion thereof across from that arm by a corresponding one of a pair of snap rings, 23'. Typically, there will be used either bearings such bearing assemblies 23 or, alternatively, bushings between each member of trunnion pair 21 of pivoting link 20 and (a) the arm of base 12" through which shaft 18 extends and (b) the triangular shaped central plate portion thereof across from that arm.

Rotation of the rotor in electric motor 16 clockwise or counterclockwise causes shaft 18 to rotate in a corresponding angular direction which in turn causes pivoting link 20 to correspondingly rotate about the axis of symmetry through trunnions 21. That is, such rotations by motor 16 force pivoting link 20 to in turn rotate one way or the other about trunnions 21 in bearing assemblies 23, around a rotation axis extending through those trunnions that is more or less perpendicular to the length of link 20.

Figure 3:
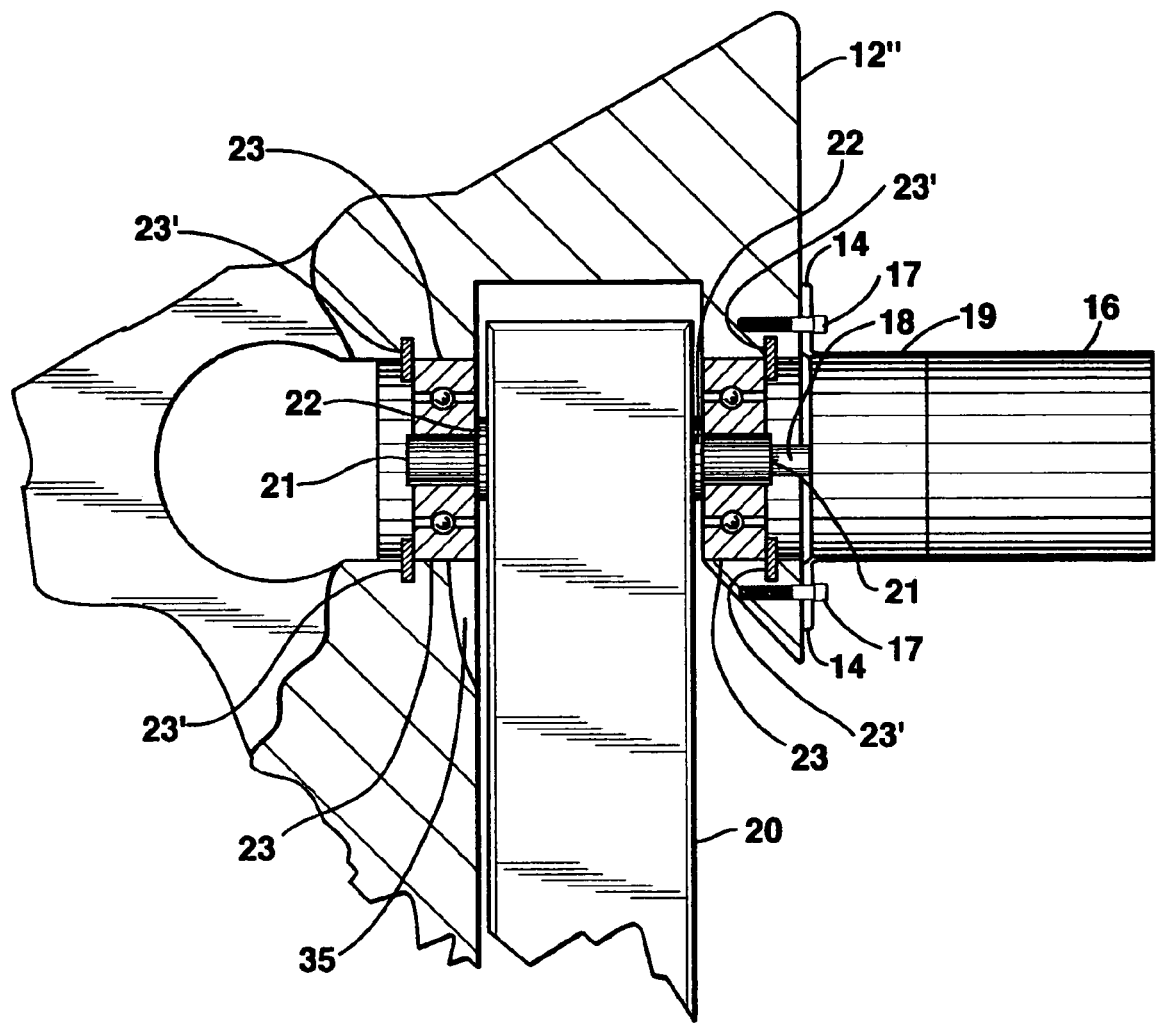
Figure 4:
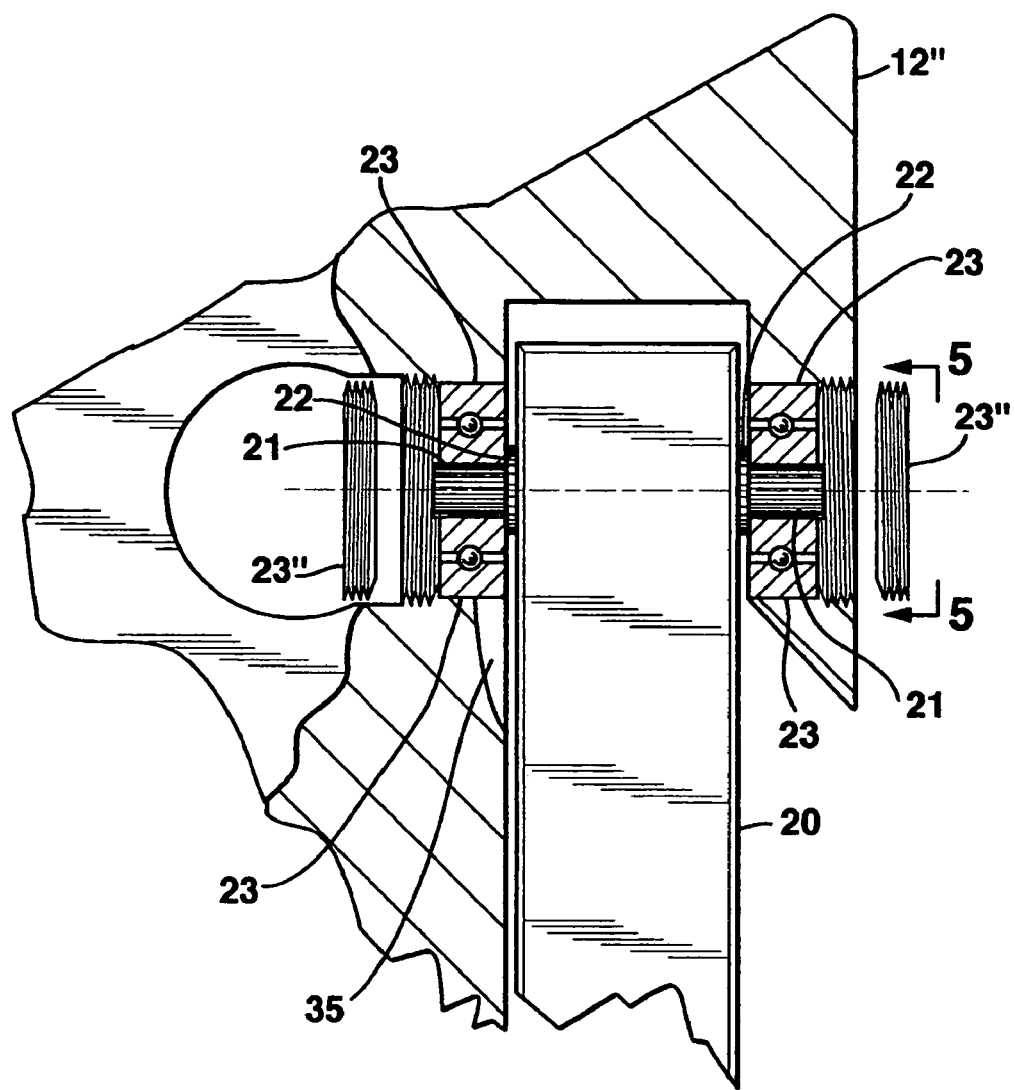
Figure 5:
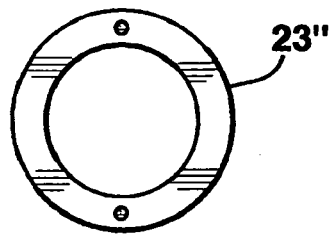

FIGS. 4 and 5 show an alternative arrangement for retaining bearing assemblies 23 between trunnions 21 of pivoting link 20 and (a) the arm of base 12" through which shaft 18 extends and (b) the corresponding triangular shaped central plate portion thereof across from that arm. (Mounting plate 14, motor 16, screws 17, splined shaft 18 and speed reduction gear assembly 19 have not been shown for purposes of clarity.) Rather than using snap rings 23' as in FIG. 3 for this purpose, bearing sets 23 are retained in the corresponding openings in (a) the arm of base 12" through which shaft 18 extends and (b) the corresponding triangular shaped central plate portion thereof across from that arm by one of a pair of threaded rings, 23". Of course, this requires that the surfaces of base 12" about these openings also be correspondingly threaded to accommodate threaded rings 23". Use of such threaded rings allows selecting a desired preloading force to be applied against each of ball bearing assemblies 23 for the purpose of reducing or eliminating backlash to thereby permit more precise positioning of the output member of mechanical manipulator 10.

Motor 16 (and so motor 15) is described above being in a direct drive arrangement (ignoring speed reduction gear assembly 19). Other drive train arrangements can be provided in addition (or in place of assembly 19) for various purposes such as instead using a drive train having worm gears to thereby prevent backdriving of mechanical manipulator 10 from its output member, or instead using belts, chains, extended shafts, gears, linear actuators or the like to allow positioning the motors differently with respect to the manipulator, etc. As an example, motors 15 and 16, rather than being directly mounted to a corresponding arm of base 12" of manipulator 10, could be offset away from base 12" of manipulator 10 in each being mounted in a corresponding pedestal supported on mounting arrangement 11 and having an extended version of splined shaft 18 that again extends from speed reduction gear assembly 19 to be positioned within the bore of the interiorly splined fitting at the end of the outer one of a trunnion pair 21. This arrangement can be used to provide no more than an extended shaft in some paths of the lower pivoting links before unacceptable interference between those links and other joint structure occurs at extreme joint deflection angles to thereby allow those angles to be of larger magnitudes.

As indicated above, an identical electric motor rotational drive system for forcing rotational motion of another pivoting link is provided in connection with electric motor 15. A speed reduction gear assembly, 19', (unseen in FIGS. 1 and 2) is affixed to the rotor shaft of motor 15 with them together being affixed by a mounting plate 14 with screws 17 to another corresponding arm of base 12" of manipulator 10 to serve as a rotary actuator (this mechanical connection is unseen in FIGS. 1 and 2). Electric motor 15, like motor 16, has a splined shaft, 18', extending from included speed reduction gear assembly 19' extending through an opening in this other arm of base 12" (all, except for motor 15, unseen in FIGS. 1 and 2) to engage a further pivoting link, 20', by being positioned within the bore of an interiorly splined fitting at the end of the outer one of a pair of integrally formed trunnions, 21', extending perpendicularly outward from opposite sides of pivoting link 20'. Here, too, the exterior splines of shaft 18' mate with the interior splines of that trunnion fitting. Each of a pair of integrally formed shoulder rings, 22', like shoulder rings 22, is again positioned about a corresponding one of trunnions 21' and against the rest of the main body of pivoting link 20' to maintain symmetrical positioning of pivoting link 20' in the spacing between the arm of base 12" through which shaft 18' extends and the corresponding triangular shaped central plate portion thereof across from that arm.

Trunnions 21' are, like trunnions 21, each mounted in the opening in the corresponding one of (a) that arm of base 12" through which shaft 18' extends and (b) the corresponding triangular shaped central plate portion thereof across from that arm by a corresponding one of a pair of ball bearing assemblies 23 like ball bearing assemblies 23 described above. The opening in the side of the corresponding triangular shaped central plate portion of base 12" across from that arm is accessible through a further opening extending thereto from either or both triangular faces of that base. The ball bearing assemblies here are each retained in a corresponding one of (a) the opening in that arm of base 12" through which shaft 18' extends and (b) the opening in the corresponding triangular shaped central plate portion thereof across from that arm by a corresponding one of a pair of snap rings 23' like snap rings 23' described above or alternatively by a corresponding one of a pair of threaded rings 23" like rings 23" described above.

Rotation of the rotor in electric motor 15 clockwise or counterclockwise causes shaft 18' to rotate in a corresponding angular direction which in turn causes pivoting link 20' to correspondingly rotate about the axis of symmetry through trunnions 21'. That is, such rotations by motor 15 force pivoting link 20' to in turn rotate one way or the other about trunnions 21' in the bearing assemblies in which they are mounted, around a rotation axis extending through those trunnions that is more or less perpendicular to the length of link 20'.

Pivoting links 20 and 20' are two pivoting links in a plurality of lower pivoting links in manipulator 10, this lower plurality further including another pivoting link, 20". This last pivoting link, though having no motor engaged therewith, is capable of rotating in bearings like bearings 23 about a pair of integrally formed trunnions, 21", extending out from opposite sides of pivoting link 20". Each of a pair of integrally formed shoulder rings, 22", like shoulder rings 22, is again positioned about a corresponding one of trunnions pair 21" and against the rest of the main body of pivoting link 20" to maintain symmetrical positioning of pivoting link 20" in the spacing between the remaining arm of base 12" and the corresponding triangular shaped central plate portion thereof across from that arm.

Trunnions 21" are, like trunnions 21 and 21', each mounted in the opening in the corresponding one of (a) the remaining arm of base 12" and (b) the corresponding triangular shaped central plate portion thereof across from that arm by a corresponding one of a pair of ball bearing assemblies 23 like ball bearing assemblies 23 described above. The opening in the side of the corresponding triangular shaped central plate portion of base 12" across from that arm is accessible through a further opening extending thereto from either or both triangular faces of that base. The ball bearing assemblies here are each retained in a corresponding one of (a) the opening in the remaining arm of base 12" and (b) the opening in the corresponding triangular shaped central plate portion thereof across from that arm by a corresponding one of a pair of snap rings 23' like snap rings 23' described above or alternatively by a corresponding one of a pair of threaded rings 23" like rings 23" described above.

Each of trunnion pairs 21,21' and 21" is rotatably engaged with base 12" such that the corresponding one of the plurality of lower pivoting links 20,20' and 20" rotatably coupled to base 12" thereby rotates about the axis of symmetry through its trunnion pair that intersects, and is perpendicular to, the axis of radial symmetry of cylindrical shell structure 12' and opening 13. These rotation axes are each separated from adjacent ones by equal angles measured about the symmetry axis, here 120°.

The lower plurality of pivoting links 20,20' and 20", in addition to each having an end thereof being rotatably connected through trunnion pairs 21,21' and 21" to base support 12 as described above, also each have formed therein at the opposite end thereof shackles, 24,24' and 24", rotatably connecting these links to a pivot holder comprising three corresponding individual and separated pivot holder members, 25,25' and 25", which have no direct connections therebetween. Shackles 24,24' and 24" each have a pair of integrally formed arms extending outwardly from the side of its pivoting link from which one of its trunnions also extends to thereby be generally parallel one another, and to that trunnion, with each of these arms having an opening therethrough near its far end.

Each of pivot holder members 25,25' and 25" is formed as a pair of beams, or legs, joined at an oblique angle in sort of the outline shape of the leading edges of an arrowhead to thus have opposite sides such that one is of a convex outline and the other concave. Each of these pivot holder members is also formed with corresponding pairs of integrally formed trunnions, 26a, 26b, 26'a, 26'b, 26"a and 26"b, (not all seen in these figures) at opposite ends thereof (thus, trunnion pair 26a is positioned at one end of pivot holder member 25 and trunnion pair 26b at the other, for example) with one trunnion in each of these pairs extending generally perpendicularly outward from its pivot holder member at the convex side thereof and the other, directly across from the first, extending generally perpendicularly outward from that pivot holder member at the concave side thereof. Each member of a pair of integrally formed shoulder rings, 26aa, 26bb, 26'aa, 26'bb, 26"aa and 26"bb (not seen in these figures), like shoulder rings 22, is again positioned about a corresponding member of trunnion pairs 26a, 26b, 26'a, 26'b, 26"a and 26"b and against the rest of the main body of the corresponding one of pivot holder members 25,25' and 25" to maintain symmetrical positioning of those pivot holder members in the corresponding one of the spacings between the arms of the shackles in the corresponding one of the lower and upper pivoting links to which they are rotatably coupled as is describe in the following.

Those trunnions in the pivot holder members trunnion pairs 26a, 26'a and 26"a, used in rotatably connecting pivot holders members 25,25' and 25" to a corresponding one of lower plurality of pivoting links 20,20' and 20", are held in a far end opening in a corresponding arm of the corresponding one of shackles 24,24' and 24" by a corresponding ball bearing assembly 23 like ball bearing assemblies 23 described above. These ball bearings assemblies are each retained in the corresponding one of the shackle arms far end openings by a corresponding snap ring 23' like snap rings 23' described above.

The axis of rotation of each of the lower plurality of pivoting links 20,20' and 20" through a corresponding one trunnion pairs 26a, 26'a and 26"a in being rotatably coupled to a corresponding one of pivot holder members 25,25' and 25", and the axis of rotation of each of these links through a corresponding one of trunnion pairs 21,21' and 21" in being rotatably coupled to base support 12 are, in each link instance, perpendicular to planes that intersect one another at substantially right angles. These rotation axes for each of these links are also oriented in directions differing from those in an adjacent link, i.e. the next link thereafter around base support 12. This allows pivot holder members 25, 25' and 25" to be moved by the corresponding pivoting links substantially with respect to base support 12, but for the same length links these pivot holder members will always be in a plane common thereto, and will move about a circle in such planes.

Although pivot holder members 25,25' and 25" are shown in these figures as a pair of beams, or legs, joined at an oblique angle, this shape is not required but instead other geometrical shapes could be used. One such alternative shape clearly could be just a portion of a cylindrical shell truncated both in length and in the extent of the shell wall about an axis of radial symmetry.

Manipulator 10 is shown in these figures having a further upper plurality of pivoting links as indicated above. Each one of this plurality has at one end thereof a further set of shackles, 27, 27' and 27", that rotatably couples that link to a corresponding one of pivot holder members 25,25' and 25". Shackles 27,27' and 27" each have a pair of integrally formed arms extending outwardly from the side of its pivoting link to thereby be generally parallel one another, and with each of these arms having an opening therethrough near its far end. Those trunnions in the previously described pivot holder members trunnion pairs 26b, 26'b and 26"b are used in rotatably connecting pivot holders members 25,25' and 25" to a corresponding one of the upper plurality of pivoting links. This is accomplished by each such trunnion being held in a far end opening in a corresponding arm of a corresponding one of shackles 27, 27' and 27" by a corresponding ball bearing 23 like ball bearing assemblies 23 described above. These ball bearings assemblies are each retained in the corresponding one of the shackle arms far end openings by a corresponding snap ring 23' like snap rings 23' described above.

The axis of rotation of the corresponding one of this upper plurality of pivoting links, in being able to rotate about pivot holder members trunnion pairs 26b, 26'b and 26"b, is directed so as to be more or less parallel to the length of the link and to lie in that plane intersecting the corresponding one of pivot holder members 25,25' and 25" so as to have lying in it all of the trunnions extending outwardly from that pivot holder member. As a result, there is a corresponding one of a set of angles, 28,28' and 28", of a selected angular magnitude between the axis of rotation of the pivoting link from the lower plurality thereof rotatably connected to each pivot holder member and the axis of rotation of the one of the upper plurality of pivoting links also rotatably connected thereto as shown in these figures. The selection of the magnitude of each of angles 28, 28' and 28" affects the capabilities of manipulator 10 as will be described below.

Pairs of integrally formed trunnions, 29,29' and 29", are each provided for a corresponding one of an upper plurality of pivoting links, 30,30' and 30", at the ends thereof opposite that from which shackles 27,27' and 27" extend. Trunnion pairs 29,29' and 29" each have its pair member extending outwardly from opposite sides of the corresponding one of upper plurality pivoting links 30,30' and 30" with one thereof extending from the same side as the shackle arms of that link extend so as to have the symmetry axis extending through both pair members generally parallel to those arms. If manipulator 10 is constructed symmetrically above and below a plane bisecting the angle between the rotation axes of the two pairs of trunnions in each of pivot holder members 25,25' and 25" (a horizontal plane in FIG. 1), i.e., angles 28,28' and 28" in these figures being bisected by such a common plane, the upper plurality of pivoting links 30, 30' and 30" can be identical in construction with each other and with each of the lower plurality of pivoting links 20,20' and 20". Although this is a significant economic factor in manufacturing significant numbers of joint or manipulator 10, this symmetry is not required for successful operation of such manipulators. However, the nature of the positioning of the output structure in such manipulators for a given rotation of the rotor shafts of motors 15 or 16 will change with differences in the portions of angles 28,28' and 28" above and below the horizon. Also, the lengths of pivoting links in the upper and lower pluralities thereof need not all be the same to have successful operation of manipulator 10 but, again, the pattern of the positioning of this output structure will change depending on such differences.

A hole, 31, provided through the manipulator output structure shown here as a manipulable support, 32, which is controlled as to position in manipulator 10 by motion of the rotors of electric motors 15 and 16. Manipulable support 32 has hole 31 extending therethrough shown beginning at a truncated cylindrical shell, 32', representing some sort of toolholder, continuing through a base, 32", such that the portions of hole 31 in shell 32' and base 32" are coaxial. Base 32", like base 12", is shown having a triangular shaped central plate portion with three outlying partially spaced apart arms each primarily paralleling a corresponding triangular central plate portion side but with each such arm extending from a corresponding triangular central plate portion corner formed in part by that side. These arms, in each extending from such a corner, begin with the outer side thereof extending tangentially from another adjacent triangular central plate portion side which in part also forms that corner, and which then further extends in changed directions so as to form the primary extent thereof parallel to a corresponding triangular central plate portion side. As shown in FIG. 1, bases 12" and 32" have the same shape but base 32" is positioned rotated about a horizontal axis 180° from base 12", and further rotated about a vertical axis to have the center lines in the arm spacings of 32" positioned 120° from those of base 12". Again, geometrical shapes other than such a triangular shaped base and a cylindrical shell can be used, and again various items can be extended through opening 31 just as through opening 13 such as electrical wiring or optical fibers or, in this output situation, a further mechanical device can be supported on support 32 which may be adapted in configuration to accommodate such a device, and some combination of such features can be used or other alternatives.

Each of pivoting links 30,30' and 30" in the upper plurality thereof is rotatably coupled to manipulable support 32 by a corresponding one of trunnion pairs 29,29' and 29" mounted, respectively, in the openings in a corresponding one of (a) an arm of base 32" and (b) the triangular shaped central plate portion thereof across from that arm by a corresponding one of a plurality of pairs of ball bearing assemblies 23 like ball bearing assemblies 23 described above. The opening in the side of the corresponding triangular shaped central plate portion of base 32" across from that arm is accessible through a further opening extending thereto from either or both triangular faces of that base.

These ball bearing assemblies 23 are each retained in a corresponding one of (a) the opening in that arm of base 32" and (b) the opening in the triangular shaped central plate portion thereof across from that arm by a corresponding one of a pair of snap rings 23' like snap rings 23' described above, although threaded rings can instead be used as described above. Again, there will typically be used either bearings such as bearing assemblies 23 or, alternatively, bushings between trunnion pairs 29,29' and 29" and the arms and triangular shaped central plate portions across therefrom in base 32". Each of a pair of integrally formed shoulder rings,33,33' and 33", like shoulder rings 22, (not seen in these figures) is again positioned about a corresponding member of trunnion pairs 29, 29' and 29' and against the rest of the main body of corresponding of upper pivoting links 30, 30' and 30" to maintain symmetrical positioning of those pivoting links in the corresponding one of the slot spacings between the arms of base 32" and the corresponding triangular shaped central plate portion thereof across from that arm.

Here too, each of trunnion pairs 29,29' and 29" is rotatably engaged with base 32" such that the corresponding one of the plurality of upper pivoting links 30, 30' and 30" is rotatably coupled to base 32" and thereby rotates about the axis of symmetry through its corresponding trunnion pair that intersects, and is perpendicular to, the axis of radial symmetry of cylindrical shell structure 32' and opening 31. These rotation axes are each separated from adjacent ones by equal angles measured about the symmetry axis, here again 120° because of the presence of three pivot links. Although the rotation axes of the pivoting links at the rotary couplings thereof to supports 12 and 32 are described as making equal angles with adjacent ones thereof as they occur about those supports, these angles need not be identical about either support, nor identical about one support with those about the other, to be able to position support 32 over a substantial angular range, though providing substantially such identities is often convenient.

The top view of joint or manipulator 10 shown in FIG. 2 shows that pivoting links 30,30' and 30" in the upper plurality thereof are assembled on opposite sides of base support 12 and manipulable support 32 from the corresponding ones (this correspondence being determined by an upper being connected to the same pivot holder member as the corresponding lower link) of pivoting links 20,20' and 20" in the lower plurality thereof. This results in a relatively even distribution of the pivoting link masses about the central axis in this view of joint or manipulator 10, a view in which manipulable support 32 is positioned vertically directly over base support 12 for better balance. This central axis of joint or manipulator 10 in this view extends toward the viewer symmetrically through opening 31 and passes symmetrically through unseen opening 13 therebelow. This arrangement for the pivoting links significantly improves the performance of the manipulator in positioning support 32 by allowing manipulable support 32 to be positioned at greater angles away from the vertical position shown in FIGS. 1 and 2 before some motion limiting interference occurs between members of the joint or manipulator structural components.

The axis of rotation of such a one of pivoting links 30,30' and 30" in the upper plurality thereof about its one of trunnion pairs 29,29' or 29" coupling it to support 32 extends along the axis of symmetry of that pair more or less perpendicular to the direction of the length of that link, and substantially parallel to the axis of rotation about that one of trunnion pairs 21,21' and 21" rotatably coupling the corresponding one of pivoting links 20,20' and 20" in the lower plurality thereof to base support 12. The correspondence here between the upper and lower plurality pivoting links is established by each being coupled to the same one of pivot holder members 25,25' and 25". Again here, as for links in the lower plurality thereof, the axis of rotation of a pivot link 30,30' or 30" in the upper plurality thereof in its corresponding one of shackles 27, 27' or 27" about the corresponding one of trunnion pairs 26b,26'b and 26"b of pivot holders members 25, 25' and 25" is substantially perpendicular to a plane which intersects at substantially right angles that plane which is substantially perpendicular to the axis of rotation of that link about its corresponding one of trunnion pairs 29,29' or 29".

If motors 15 and 16 are disconnected from the corresponding ones of pivoting links 20 and 20' by removing corresponding screws 21 and 21', those motors would obviously no longer be capable of operating joint or manipulator 10 to position manipulable support 32 at a desired position. However, in these circumstances, should mounting arrangement 11 be rotated, the system shown in FIGS. 1 and 2 will operate as a flexible joint with manipulable support 32 following the rotation of mounting arrangement 11 and base support 12 to transmit that rotational motion to manipulable support 32 without requiring supports 12 and 32 to be axially aligned, i.e., the axis of radial symmetry of one can be at a substantial angle with respect to the radially symmetrical axis of the other.

The various structural components of joint or manipulator 10 described in connection with FIGS. 1 and 2 above are typically formed of a metal or metals, or alloys thereof, appropriate for the intended use, i.e. perhaps stainless steel for a medical use, aluminum or titanium where weight is a primary concern, etc. Many or all of these components could be molded polymeric materials instead.

Figure 6:
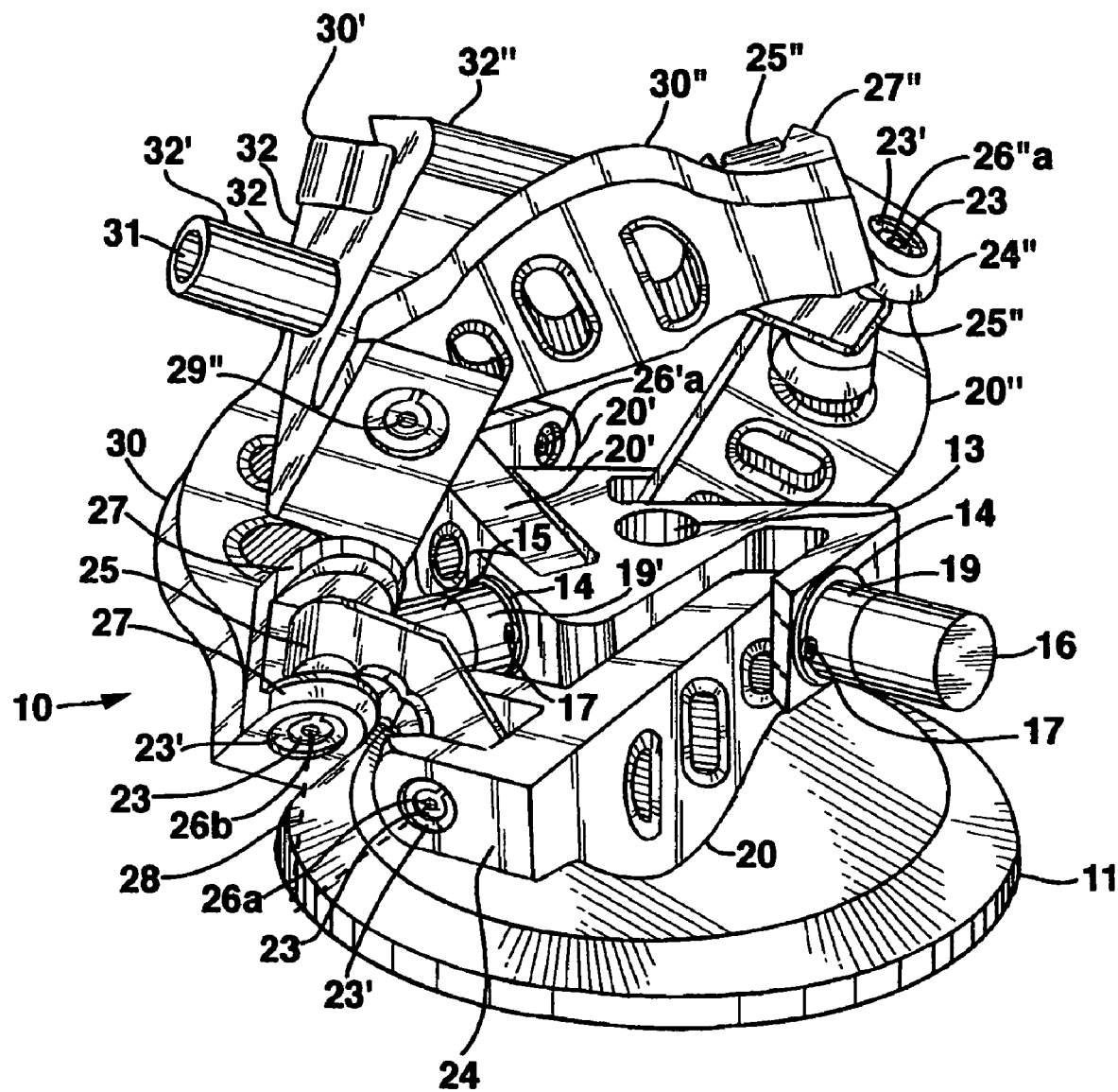
Figure 7:
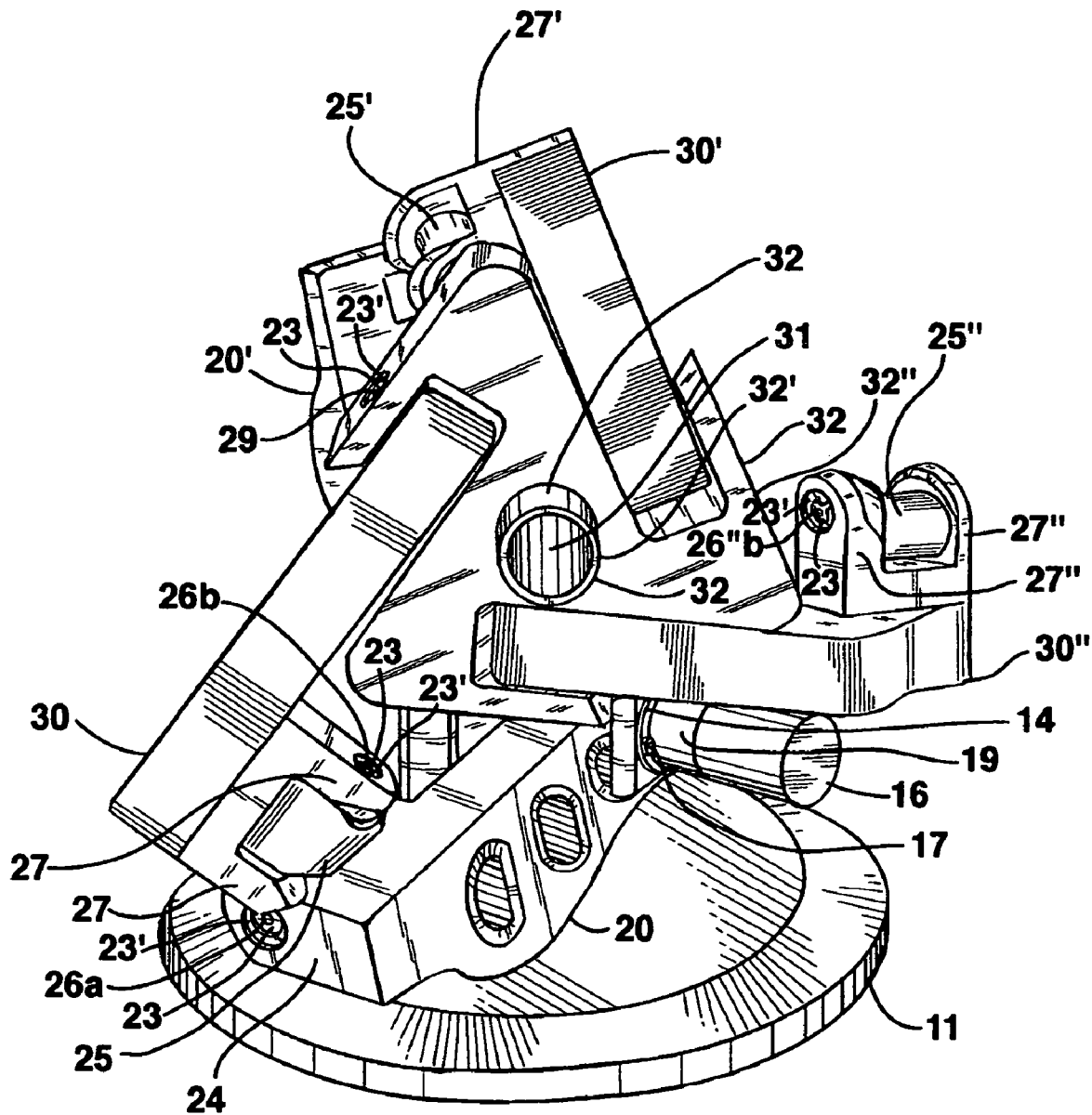
Figure 8:
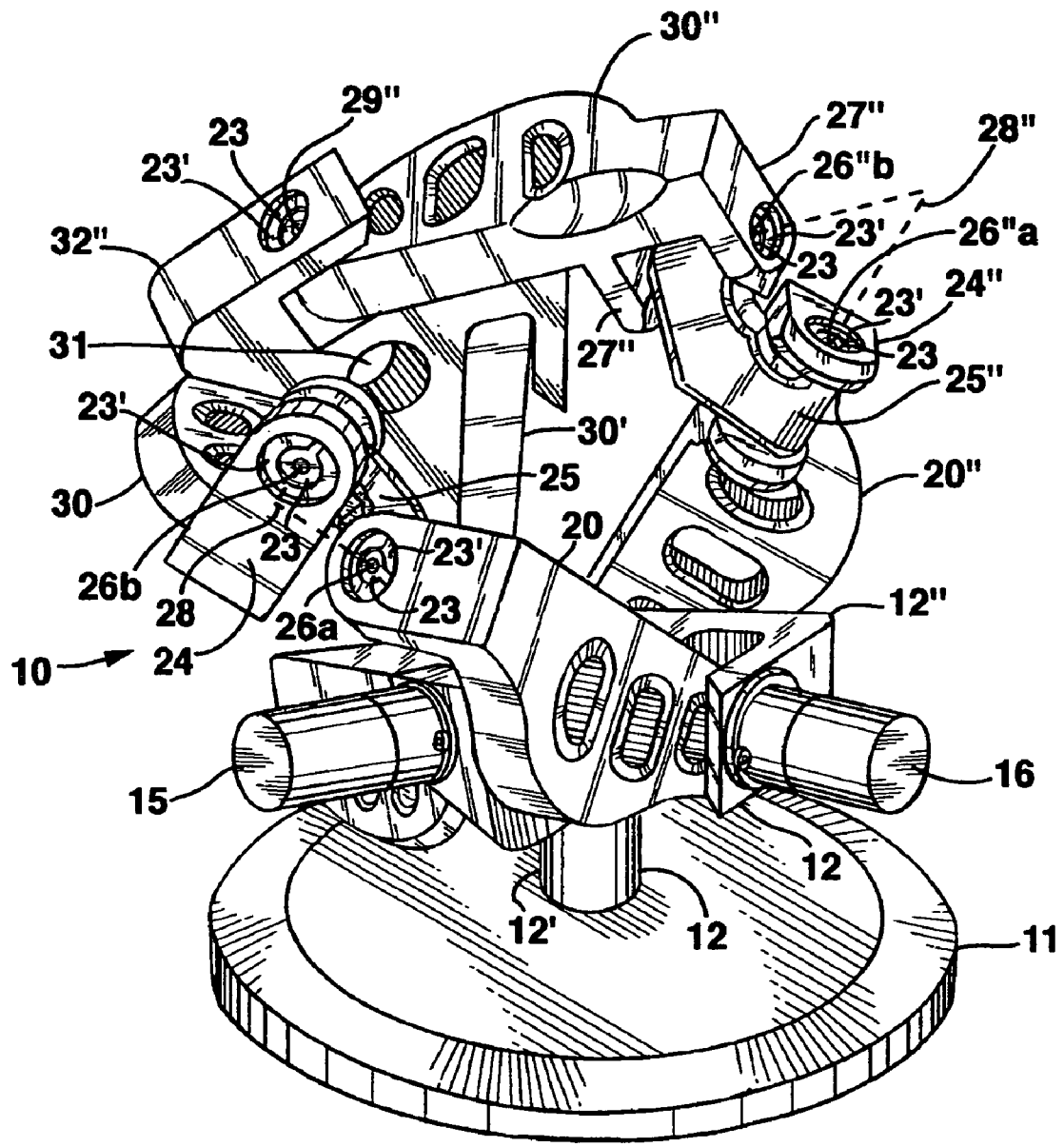

FIGS. 6, 7 and 8 show perspective views of joint or manipulator 10 after rotation of the rotors of motors 15 and 16 rotating so as to position manipulable support 32 at (a) approximately 45° down in FIG. 6 from the vertical position thereof in FIGS. 1 and 2 in a vertical plane which bisects the angle between the rotation axes of those motors, at (b) approximately 90° down in FIG. 7 from the vertical position thereof in FIGS. 1 and 2 in a vertical plane which at a about a quarter of the angle between the rotation axes of those motors to be closer to motor 16, and at (c) approximately 45° down in FIG. 8 from the vertical position thereof in FIGS. 1 and 2 in a vertical plane which at a about an eighth of the angle between the rotation axes of those motors to be closer to motor 15 and more or less reversed in rotation direction from the position thereof shown in FIG. 7. Such positions would result in FIGS. 6 and 7 from the rotors of motors 15 and 16 rotating lower pivoting links 20 and 20' with the rotor of motor 15 rotating in a clockwise direction (when looking inward along the motor) while the rotor of motor 16 rotates in a counterclockwise direction (when looking inward) as seen in the figure.

As shown in the side perspective view of FIG. 6 and in the more frontal perspective view of FIG. 7, pivot holder member 25, and the ends of pivoting links 20 and 30 rotatably coupled thereto, have rotated downward from the positions they were in when manipulable support 32 was in the vertical position thereof shown in FIGS. 1 and 2 to enable support 32 to reach the position therefor shown in those figures. Similarly, pivot holder member 25', and the ends of pivoting links 20' (drive by motor 15) and 30' rotatably coupled thereto, have rotated upward from the positions they were in when manipulable support 32 was in the vertical position therefor. Finally, pivot holder member 25", and the ends of pivoting links 20" and 30" rotatably coupled thereto, have also rotated upward from the positions they were in when the vertical position therefor. The degree of rotation of these links depends on the degree of rotation from the vertical of manipulable support 32. The rotation of these structural members and support 32 occurs primarily about a base center of rotational motion located at the intersection of the rotational axes through each of trunnion pairs 21, 21' and 21" on the axis of radial symmetry of the truncated cylindrical shell involved in forming base support 12.

At some point in the motion of support 32, further downward rotation thereof is prevented by some occurrence of mechanical interference among the various pivoting links and pivot holder members of manipulator 10 (of course, for different shaped structural components differing alternative interferences could occur to instead be the cause of termination-of such downward motion). Also, as this rotation is occurring and going from the position of manipulable support 32 in FIG. 6 to that shown in FIG. 7, a significantly increased rotation occurs about a second or manipulable center of rotational motion located at the intersection of the axis of rotations passing through trunnion pairs 29, 29' and 29" on the radial axis of symmetry of hole 31 in manipulable support 32. During the movement of manipulable support 32 from the vertical position shown in FIGS. 1 and 2 to the positions shown in FIGS. 6 and 7, pivot holder members 25, 25' and 25" remain in a common plane although a plane which changes its orientation in space with each increment of motion of support 32.

FIG. 8, as indicated above, shows, after rotation of the rotors of motors 15 and 16, rotating so that manipulable support 32 is positioned approximately 45° down from the vertical position thereof in FIGS. 1 and 2 in a vertical plane which at a about an eighth of the angle between the rotation axes of those motors to be closer to motor 15 and more or less reversed in rotation direction from the position thereof shown in FIG. 7. Such a position would result in FIG. 8 from the rotors of motors 15 and 16 rotating lower pivoting links 20 and 20' with the rotor of motor 15 rotating in a counterclockwise direction (when looking inward along the motor) while the rotor of motor 16 rotates in a clockwise direction (when looking inward) as seen in the figure.

As shown in the side perspective view of FIG. 8, pivot holder member 25, and the ends of pivoting links 20 and 30 rotatably coupled thereto, have rotated upward from the positions they were in when manipulable support 32 was in the vertical position thereof shown in FIGS. 1 and 2 to enable support 32 to reach the position therefor shown in that figure. Similarly, pivot holder member 25', and the ends of pivoting links 20' (drive by motor 15) and 30' rotatably coupled thereto, have rotated downward from the positions they were in when manipulable support 32 was in the vertical position therefor. Finally, pivot holder member 25", and the ends of pivoting links 20" and 30" rotatably coupled thereto, have also rotated upward from the positions they were in when manipulable support 32 was in the vertical position therefor. The degree of rotation of these links again depends on the degree of rotation from the vertical of manipulable support 32. The rotation of these structural members and support 32 involves again the same centers of rotational motion with pivot holder members 25, 25' and 25" again remaining in a common plane although a plane which changes its orientation in space with each increment of motion of support 32. Further downward rotation thereof is here also prevented by some resulting mechanical interference among the various pivoting links and pivot holder members of manipulator 10.

Figure 9:
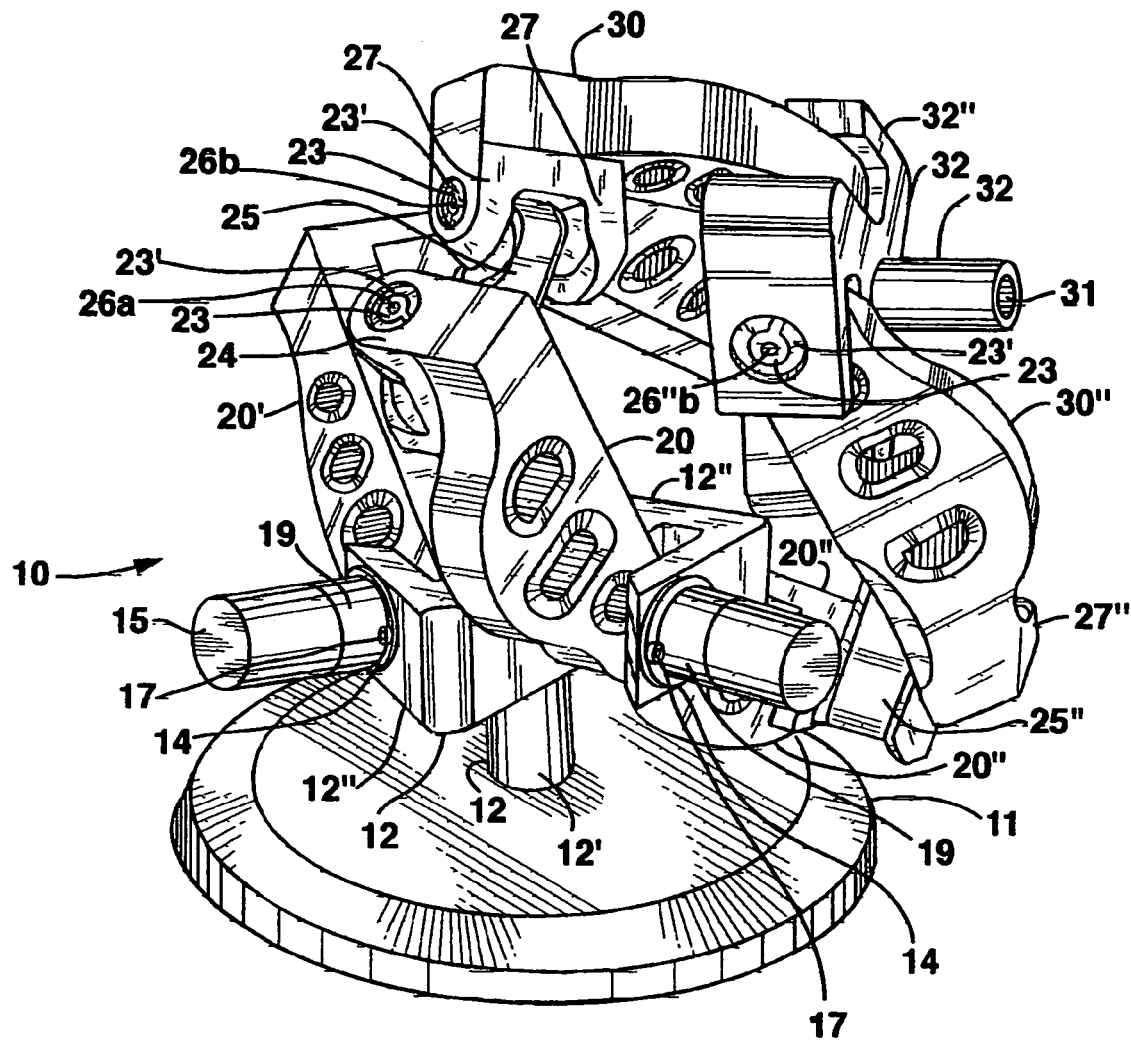

Following another alternative rotation of the rotors of motors 15 and 16, FIG. 9 shows manipulable support 32 positioned approximately 90° down from the vertical position thereof in FIGS. 1 and 2 in a vertical plane which is more or less perpendicular to the vertical plane which bisects the angle between the rotation axes of those motors. Such a position would result in FIG. 8 from the rotors of motors 15 and 16 rotating lower pivoting links 20 and 20' with the rotor of motor 15 rotating in a counterclockwise direction (when looking inward along the motor) while the rotor of motor 16 rotates in a clockwise direction (when looking inward) as seen in the figure.

As shown in the side perspective view of FIG. 9, pivot holder member 25, and the ends of pivoting links 20 and 30 rotatably coupled thereto, have rotated upward from the positions they were in when manipulable support 32 was in the vertical position thereof shown in FIGS. 1 and 2 to enable support 32 to reach the position therefor shown in that figure. Similarly, pivot holder member 25', and the ends of pivoting links 20' (drive by motor 15) and 30' rotatably coupled thereto, have also rotated upward from the positions they were in when manipulable support 32 was in the vertical position therefor. Finally, pivot holder member 25", and the ends of pivoting links 20" and 30" rotatably coupled thereto, have rotated downward from the positions they were in when manipulable support 32 was in the vertical position therefor. The degree of rotation of these links again depends on the degree of rotation from the vertical of manipulable support 32. The rotation of these structural members and support 32 involves again the same centers of rotational motion with pivot holder members 25, 25' and 25" again remaining in a common plane although a plane which changes its orientation in space with each increment of motion of support 32. Further downward rotation thereof will similarly be prevented by some resulting mechanical interference among the various pivoting links and pivot holder members of manipulator 10.

Figure 10A:
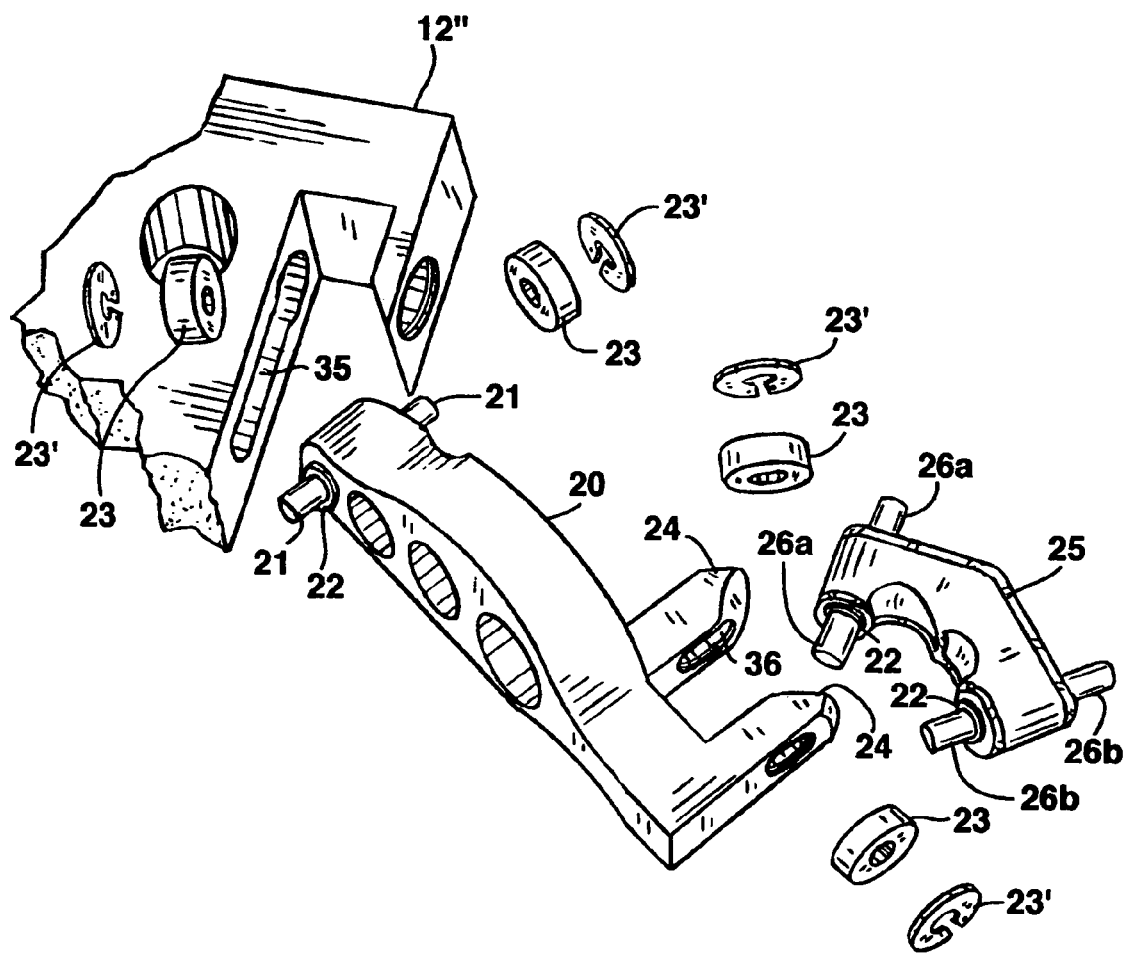
FIGS. 10A through 10E show fragmentary views of a portion of the embodiment of the present invention shown in FIGS. 1 through 9, FIGS. 11A and 11E show perspective views of an alternative embodiment of the present invention shown in FIGS. 1 through 9 and of a portion thereof.
Figure 10B:
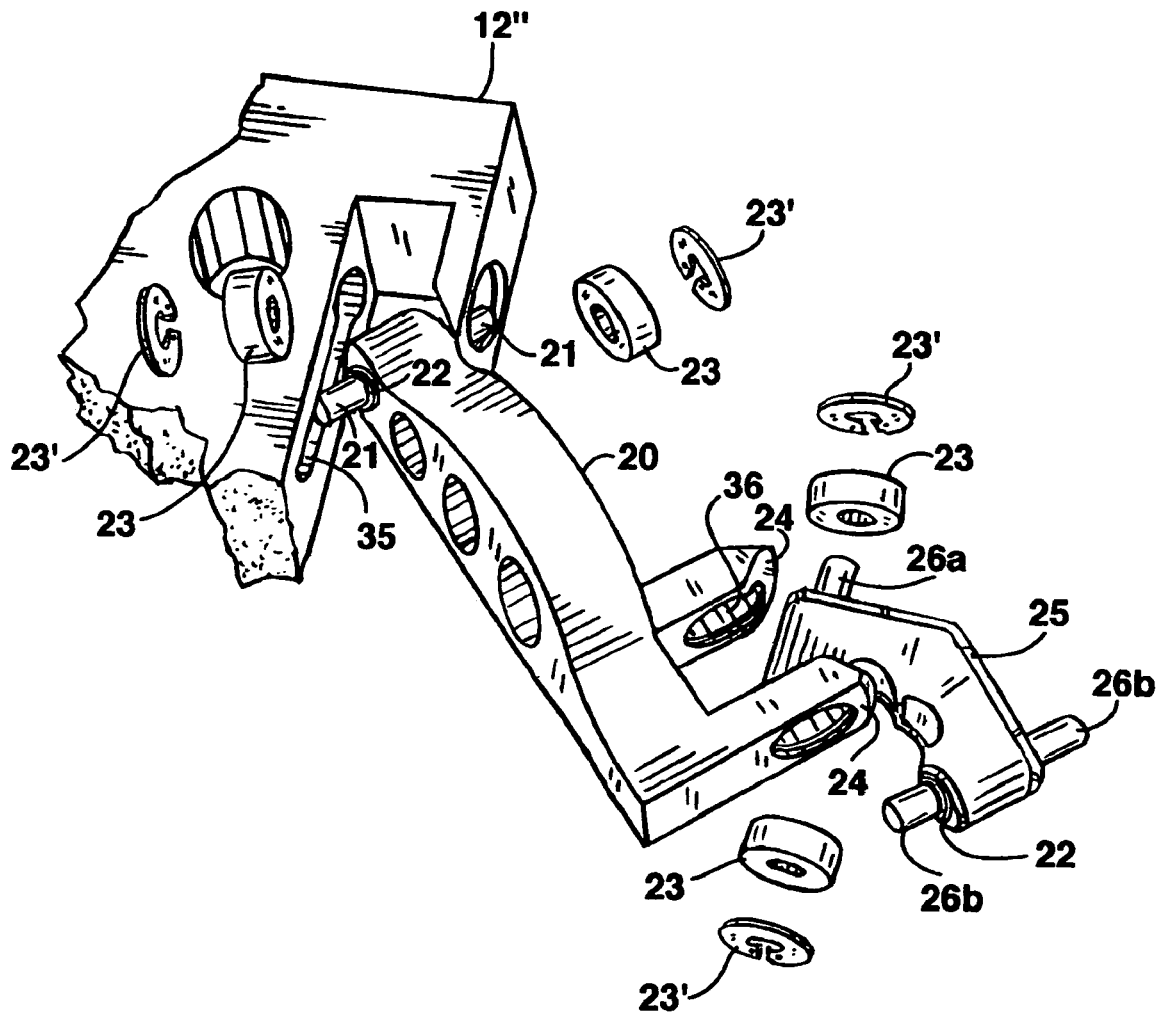
Figure 10C:
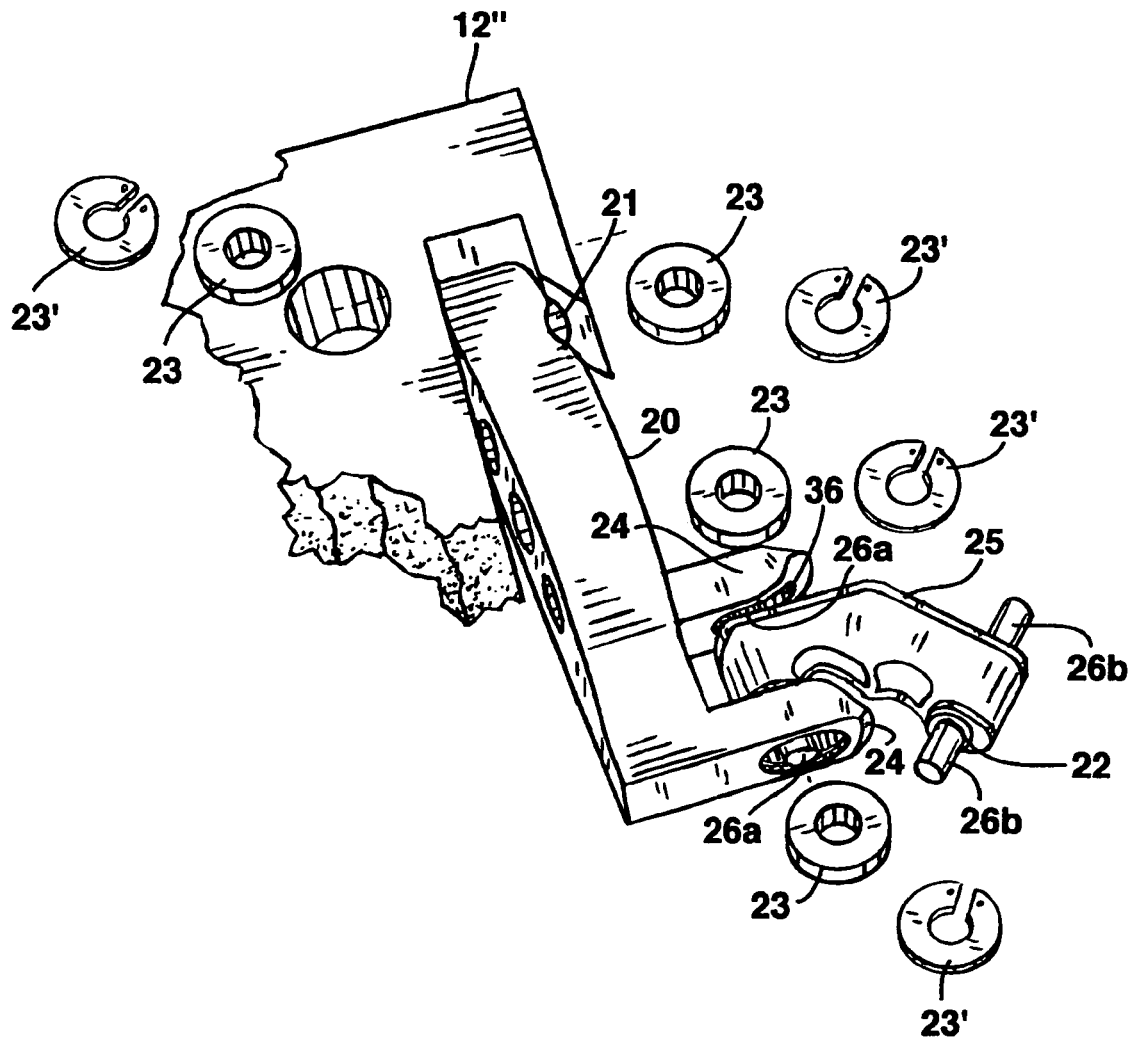

A perspective view of lower pivoting link 20 and pivot holder member 25 is provided in FIG. 10A along with a fragmentary view of base 12" before they are assembled into the rotatable coupling of link 20 to base 12" and the rotatable coupling of link 20 to member 25. As can be seen in FIGS. 3,4 and 10A, a groove, 35, begins in the side of the triangular central plate portion of base 12" across from its corresponding arm which groove deepens from there in extending parallel to the triangular faces of this triangular central plate portion to reach the opening in this triangular shaped central plate portion across from the opening at the far end of that arm. Groove 35 permits link 20 to be positioned with its length extending at an angle to the triangular central plate portion side, along with having trunnion 21 on the right side of the link positioned across from the opening at the far end of that arm, and then rotated toward having its length aligned parallel to the triangular central plate portion side as shown started in FIG. 10B. As a result, the trunnions in trunnion pair 21 of link 20 are positioned in these openings across from one another in this triangular shaped central plate portion and its corresponding arm as seen in FIG. 10C.

Similarly, as seen in FIG. 10A, a groove, 36, begins toward the outer end of the inside arm of shackle 24 in link 20 across from its corresponding arm in that shackle which groove deepens from there in extending parallel to the length of that arm to reach the far end opening in this arm across from the opening at the far end of the corresponding arm in that shackle. Groove 36 permits pivot holder member 25 to be positioned with the length of its leg from which trunnions 26a protrude extending at an angle to the lengths of the arms in shackle 24, along with having trunnion 26a on the left side of that member leg length positioned across from the opening at the far end of the outer arm in shackle 24, and then rotated toward having the axis of symmetry through trunnion pair 26a aligned perpendicular to the lengths of the arms in shackle 24 as shown started in FIG. 10B. As a result, the trunnions in trunnion pair 26a of member 25 are positioned in these openings across from one another in the arms of shackle 24 as seen in FIG. 10C.

Figure 10D:
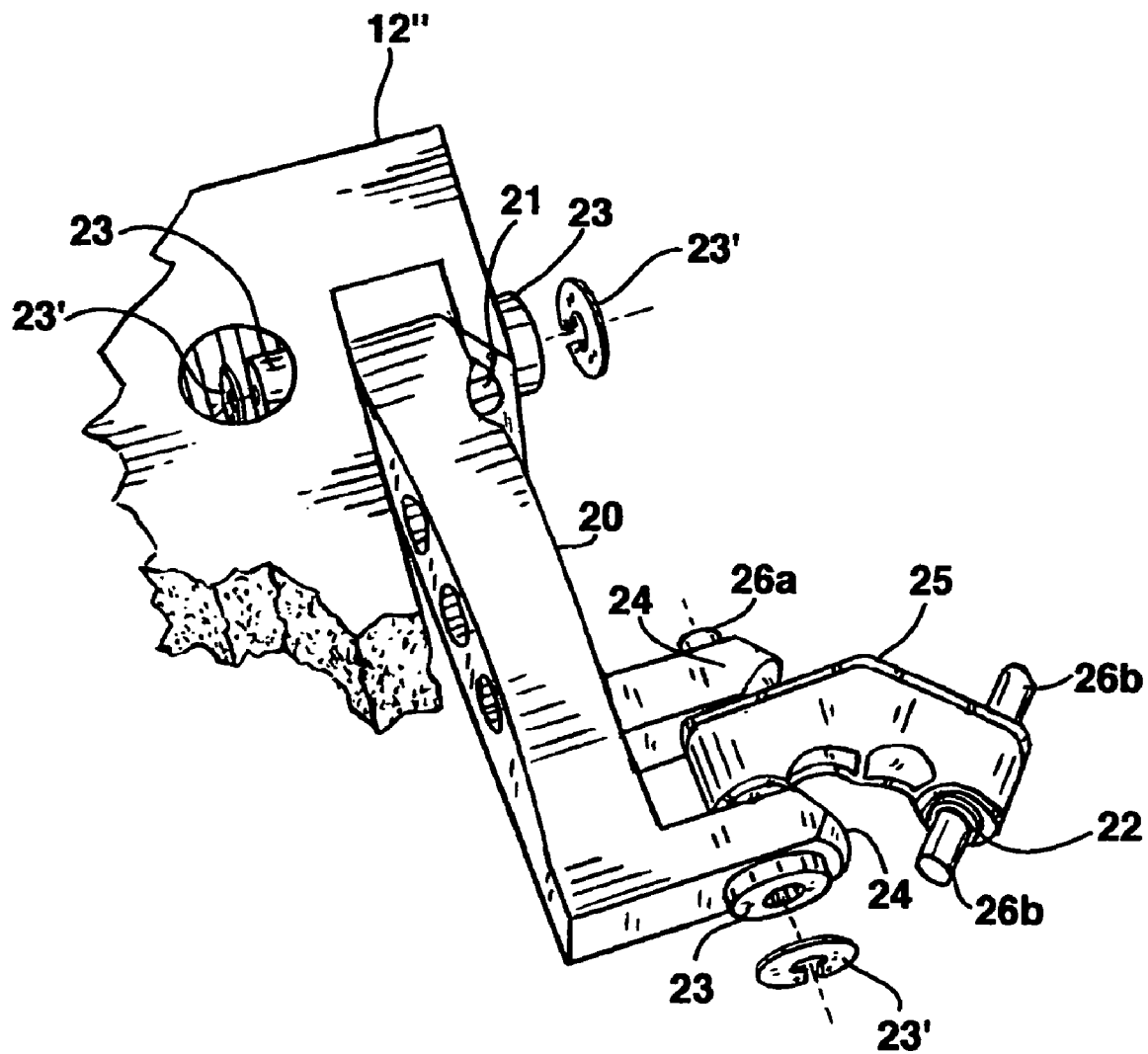
Figure 10E:
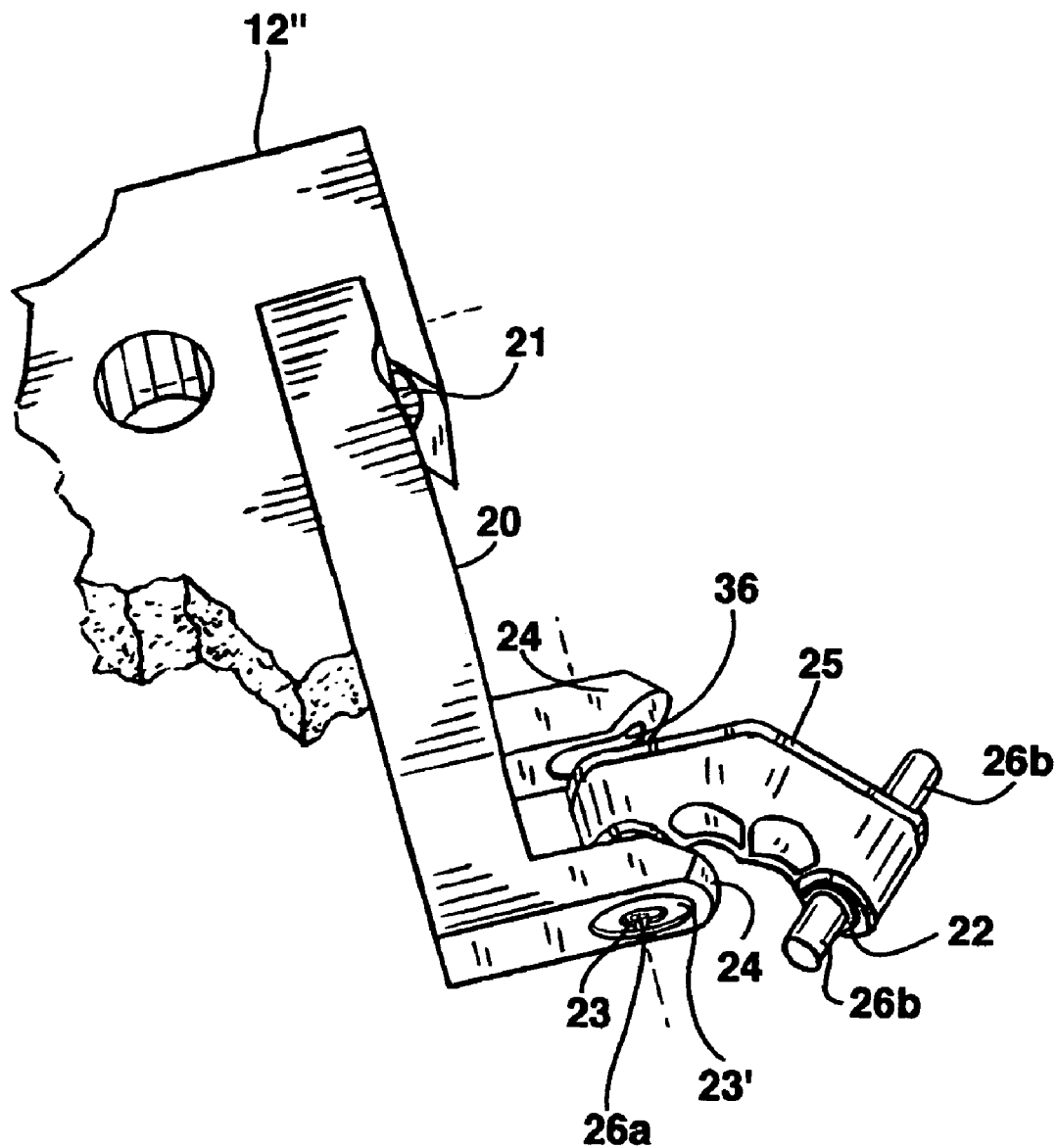

These various trunnions now positioned in the corresponding openings in which they are to be captured allows the corresponding ball bearing assemblies that will accomplish such capturing to be positioned at the opposite side of the openings from the side from which the corresponding trunnion enters that opening as seen in FIG. 10D. From there, each ball bearing assembly is forced into the corresponding opening about the trunnion therein. The ball bearing assemblies are each retained in such positions by use of a corresponding snap ring or a threaded ring just as described in connection with the example in FIGS. 3,4 and 5 above for retaining bearing assemblies 23 in the openings in base 12" in providing the rotatable coupling of link 20 to base 12".

Consider the lower plurality of pivoting links 20,20' and 20" to each be divided by a corresponding intermediate plane containing the centers of the corresponding one of trunnion pairs 21,21' and 21" therein, i.e. containing the rotation axis therethrough, and also containing therein the centers of the arms of the corresponding one of shackles 24, 24' and 24", again containing the rotation axis therethrough. Clearly there is more structural material in each of those links in the portions thereof on the side of the corresponding plane closest to mounting arrangement 11 or to the primary portion of support 12 below the base trunnion rotation axis of that link, i.e. farthest from manipulable support 32, as opposed to the parts of those pivoting links the opposite side of that plane given manipulable support 32 being in the position shown in FIGS. 1 and 2. This increased amount of structural material is shown in those figures extending in directions primarily perpendicular to such a plane in forming sort of a "hump" extending away from that plane and more or less toward mounting arrangement 11.

As a result, there is typically more than 1.25 times the volume of material in the link on the "hump" side of the intermediate plane as on the opposite side, often more than 1.5 times or even more than 2 times the material volume on the opposite side, depending on what added material volume can be provided before unacceptable interference between the resulting links and other joint structure occurs at extreme joint deflection angles from the position in which there is a common axis of symmetry through openings 13 and 31. Such interferences can occur at varying deflection angles, for example, because of different shapes of possible alternative motors chosen to be used for motors 15 and 16 which in some instances can be the deflection angle limiting interference site. In this respect, the added material volume results in an extended distribution of that material away from the intermediate plane so that, perpendicular to that plane, the extreme extent of material away from that plane on the "hump" side is at least twice that of the extreme material extent on the opposite side, and may be three or more times in some instances again depending on acceptable deflection angle limits due to structural interferences.

Similarly, consider the upper plurality of pivoting links 30,30' and 30" to each be divided by a corresponding intermediate plane containing the centers of the corresponding one of trunnion pairs 29,29' and 29" therein, and also containing therein the centers of the arms of the corresponding one of shackles 27,27' and 27". Again, there is more structural material in the parts of each of those links on the side of the corresponding plane farthest from support 12, or closest to support 32, as opposed to the parts thereof in opposite side of that plane given again that manipulable support 32 is in the position shown in FIGS. 1 and 2. This increased amount of structural material is shown extending in directions primarily perpendicular to such a plane in again forming sort of a "hump" extending away from both that plane and mounting arrangement 11.

Here too, there is typically more than 1.25 times the volume of material in the link on the "hump" side of the intermediate plane as on the opposite side, often more than 1.5 times or even more than 2 times the material volume on the opposite side. Again, the added material volume results in an extended distribution of that material away from the intermediate plane so that, perpendicular to that plane, the extreme extent of material away from that plane on the "hump" side is at least twice that of the extreme material extent on the opposite side, and may be three or more times in some instances again depending on acceptable deflection angle limits due to structural interferences.

This added structural material included in these links stiffens them against torsional twisting and bending when operating in the presence of substantial loading forces on manipulable support 32. Providing such added structural material to these links by extending it primarily perpendicularly away from such planes reduces the possibilities that this added material will result in interferences of such links, and with the supports and the pivot holder members at smaller angular deflections of manipulable support 32 from the position shown therefor in FIGS. 1 and 2 than would occur in the absence of such added material.

Figure 11A:
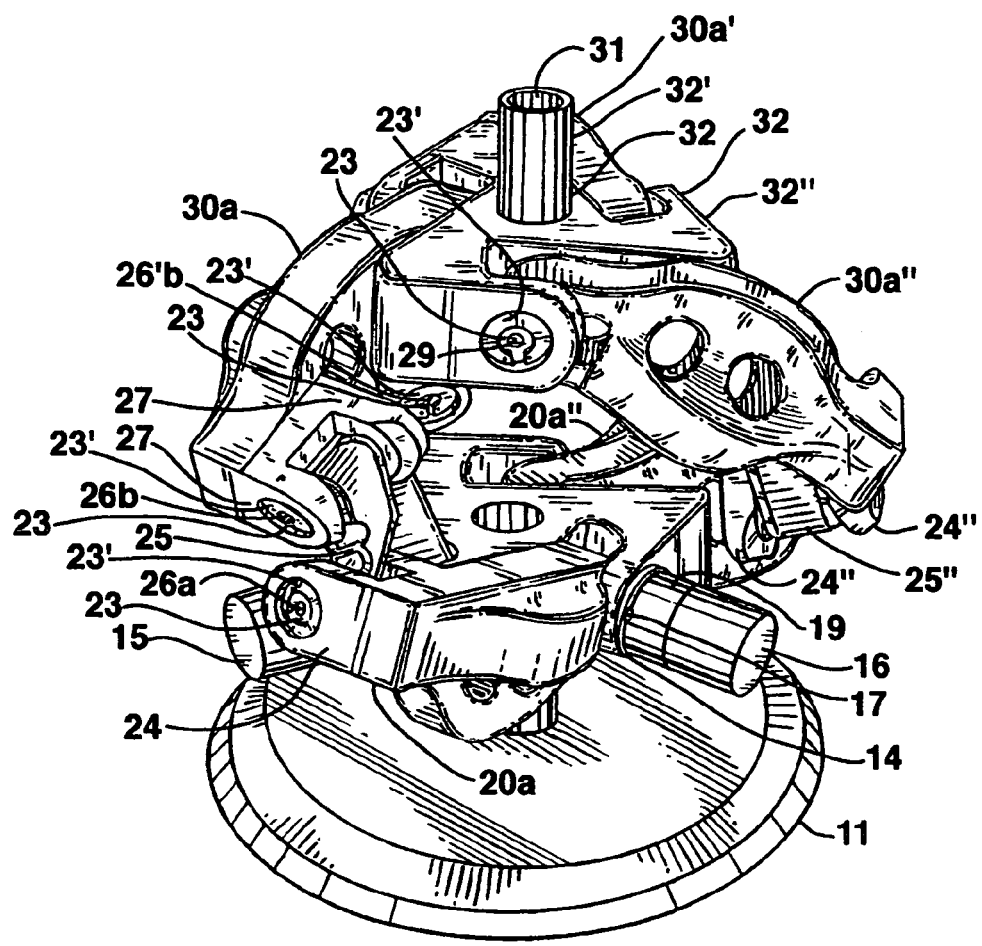

In many situations, some further structural material can also be provided directed outwardly from such perpendicularly added material in the "humps" of the links in either or both of the pluralities of upper and lower pivoting links at some location thereat on the "hump" side of the intermediate plane for that link as shown in FIG. 11A. Such further structural material is typically provided so as to be more or less parallel to that intermediate plane, of ten in the form of an outer rib or ribbing, as in the example pivoting link shown in FIGS. 11B and 11C. In these figures, the lower plurality of pivoting links have been redesignated as 20*a*, 20*a'* and 20*a"* in view of their changed shapes and material volumes, and the upper plurality of pivoting links have been redesignated as 30*a*, 30*a'* and 30*a"* for the same reason.

This addition of structural material can be carried further in some situations by adding another "hump" to each or to some of the links in the lower plurality of pivoting links 20*a*, 20*a'* and 20*a"* and the upper plurality of pivoting links 30*a*, 30*a'* and 30*a"* on the opposite side of side of the intermediate plane for that link extending away from that plane primarily in a direction opposite that in which the "hump" on the other side of that plane primarily extended. This second "hump" may require certain portions of the link not have additional structural material provided there to avoid providing what would otherwise be an interference location such as the material void region adjacent the added structural materials shown for link 20*a* in FIG. 11C across from shackle 24. Such further structural material extending in these alternative directions serves to further stiffen the link against twisting or bending without further limiting, or without further significantly limiting, the angular deflections of manipulable support 32 to relatively extreme angles from the position shown therefor in FIGS. 1 and 2.

Figure 11B:
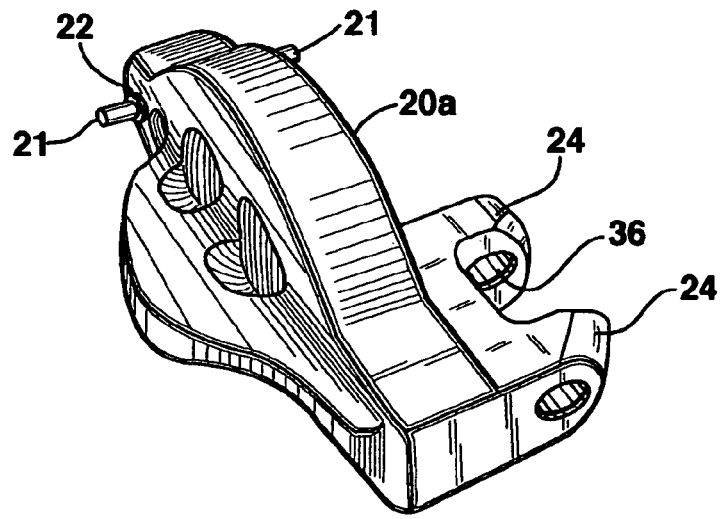
Figure 11C:
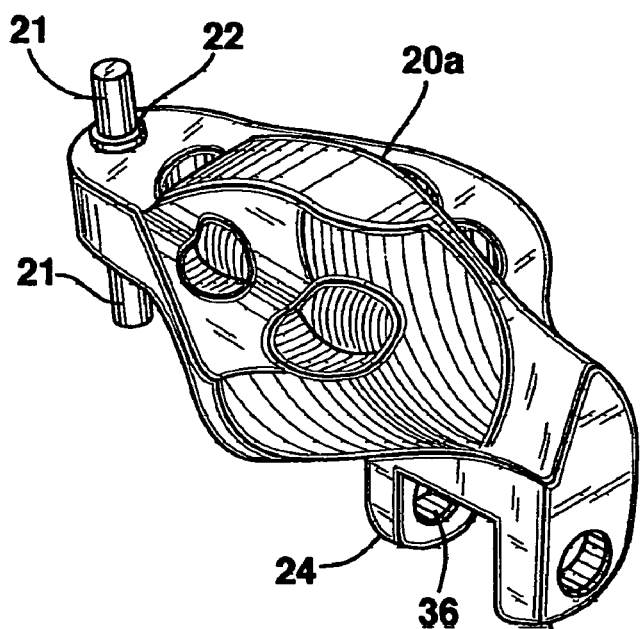
Figure 11E:
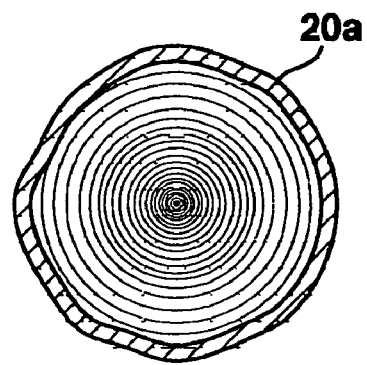
Figure 11D:
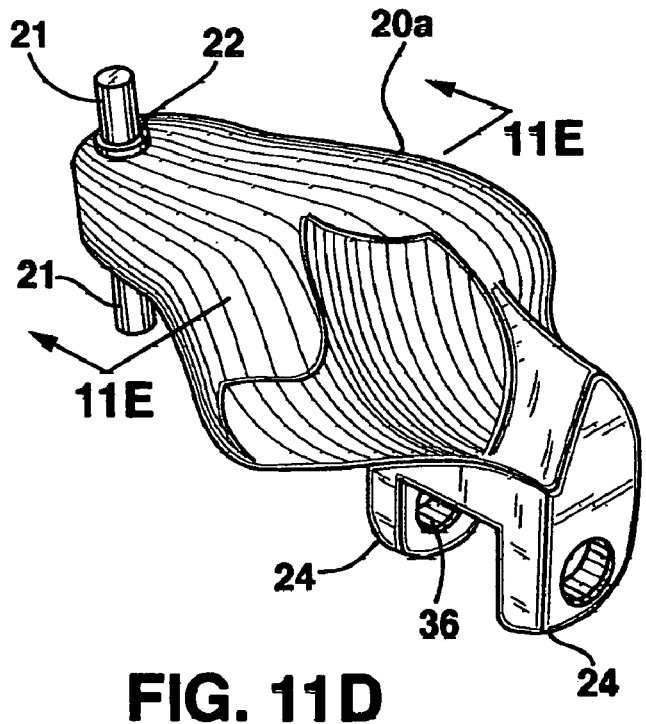

FIG. 11D shows an alternative way of implementing link 20*a* by providing a shell more or less positioned along the outer periphery of the solid material structure of that link as shown in FIGS. 11B and 11C. Such a shell structure again stiffens that link against twisting or bending without further limiting, or without further significantly limiting, the angular deflections of manipulable support 32 to relatively extreme angles from the position shown therefor in FIGS. 1 and 2, but with a much reduced mass or weight. The link is shown in FIG. 11D with a broken out portion to reveal the hollow interior thereof, and a cross section view of the link in FIG. 11D is shown in FIG. 11E again makes clear the shell-like nature of that link. Such a hollow link structure is formed using a "lost wax" process starting with a wax sprue that is coating with a ceramic that is then dipped into the metal chosen for fabricating the link shell structure.

Figure 12:
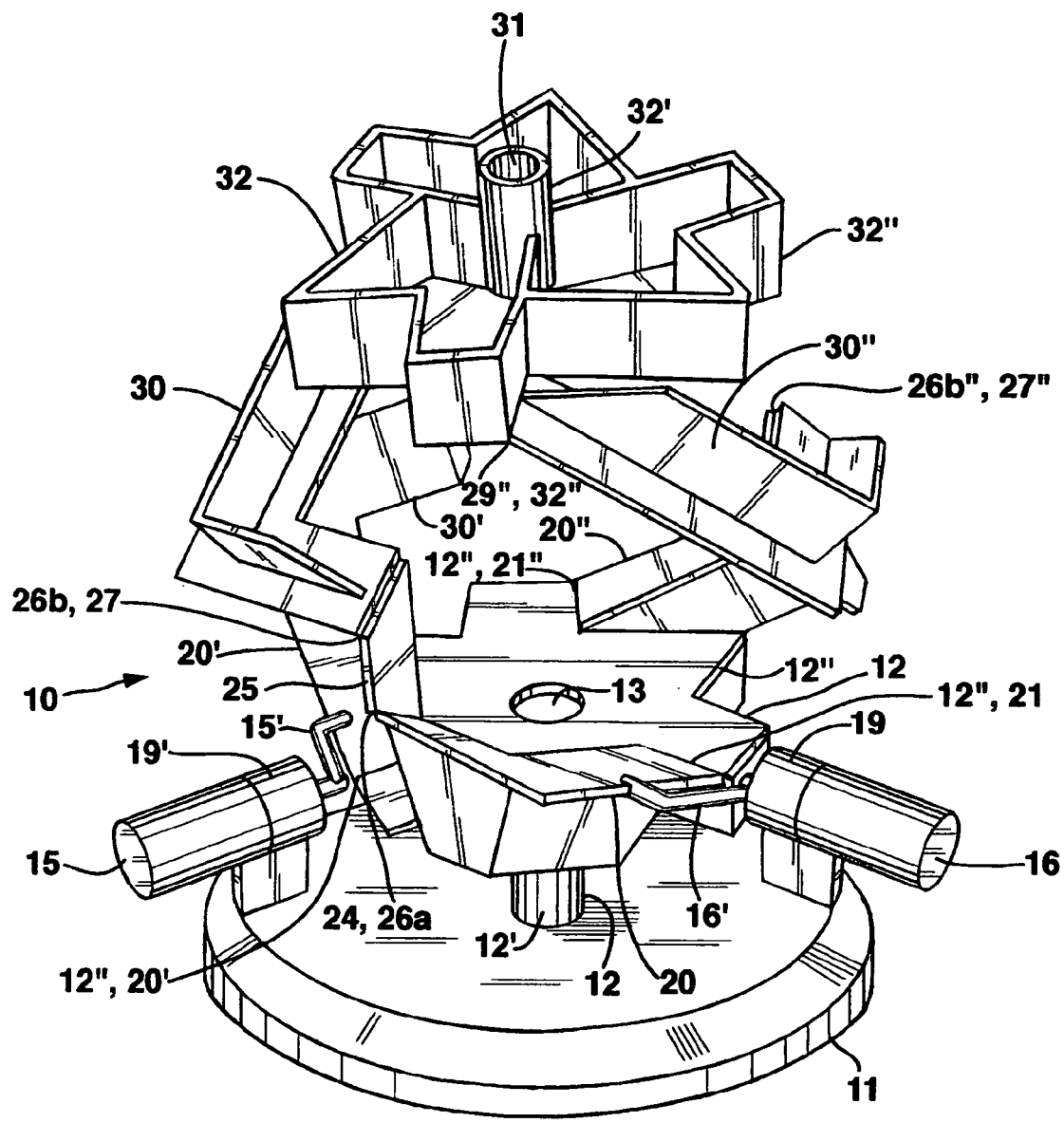
FIG. 12 shows a perspective view of an alternative embodiment of the present invention.

A further possibility for a hinge-like rotary coupling, such as is provided by the captured trunnions and shackles described above, is the use instead therefor of a so called "living hinge" arrangement. In such an arrangement the two sides of the hinge are each integral with one of the two corresponding structural members being hinged together to thereby accomplish the affixing of the hinge sides thereto, and the hinge pin is provided by a thin portion of the material forming the hinge being continuously extended between the hinge sides integrally joined with these two corresponding structural members rather than by a separate pin. A joint or manipulator, 10', embodying such "living hinge" structures is shown in FIG. 12. In this figure, structures having the same purpose as similar purpose components in the joints or manipulator examples previously given have retained the same numerical designations here, or combined same designations where a structure here takes the place of separately designated structures there, as were used in the earlier examples. This is so even though there are significant structural differences in the structural members used in FIG. 12 as compared to similar purpose components used in the earlier examples because of the use of "living hinges" in the FIG. 12 system in place of the captured trunnions and shackles used in the earlier examples.

Thus, an output shaft, 15', extending from motor 15 (now shown mounted on a pedestal extending up from mounting arrangement 11) is used to rotate pivoting link 20' about "living hinge" 12", 22' that connects that pivoting link to base 12". In the same manner, an output shaft, 16', extending from motor 16 (also now shown mounted on a pedestal extending up from mounting arrangement 11) is used to rotate pivoting link 20 about "living hinge" 12", 22 connecting it to base 12". These "living hinges" replace corresponding trunnions 21' and 21 captured in openings in base 12" as shown in previous examples. Such a "living hinge" is also provided in the structure of FIG. 12 for connecting pivoting link 20" to base 12" to rotate thereabout. The other "living hinges" provided in place of the pins or pivot screws used in the previous examples in FIGS. 1 through 9 are, when seen, designated with the numerical designations in FIG. 12 that were used for such captured trunnions and shackles in the previous examples.

As can be seen, pivoting links 20, 20' and 20" in the lower plurality thereof are formed as extended flat sheets with a more or less centrally positioned plate as added stiffening material extending perpendicularly outward from the side of the link sheet closest to mounting arrangement 11, or to the primary portion of base support 12 below the hinge axis of that link and base 12", or farthest from manipulable support 32, when manipulable support 32 is in the position shown in FIG. 12. Pivoting links 30, 30' and 30" in the upper plurality thereof are provided in the same manner. Further added plates can be provided typically perpendicular to these outward extending link plates to provide further stiffening.

Pivot holder members 25, 25' and 25" are also provided as flat sheet portions. Base support 12 and manipulable support 32 are each provided as flat triangular plates with a plate arm extending outward from each side of the triangle to have an arm side just where the bisector of that triangle side form the opposing angle in the triangle is located so that the "living hinge" formed there with a corresponding pivoting link has this bisector extended through it.

The construction of the upper and lower pluralities of pivoting links, the pivot holder members, and the "living hinges" therebetween used in place of captured trunnions and shackles in the structure of FIG. 12 allows the structure to be formed relatively inexpensively. One possibility is stamping, cutting or molding of upper and lower halves of joint or manipulator 10' with a dividing line being the intersection of pivot holder members 25, 25' and 25" with the horizontal plane common thereto at the point midway therein between the upper and lower pivoting link rotatably attached thereto by corresponding "living hinges". Each such half so formed can then be assembled into the structure of joint or manipulator 10' in FIG. 12 by merely welding the two halves of each pivot holder member together if the material chosen is a weldable metal, or by adhering the two sides of each pivot holder member together if the material is a polymer or some other material suitably joined by adhesion.

If, instead of the dividing line being in a common horizontal plane, the divide is made at the living hinges, and these hinges are made as bendable in one direction as the other, identical upper and lower halves can be made to reduce the number of different components used in the assembled manipulator. A further possibility is the provision of a three dimensional mold to form joint or manipulator 10' of FIG. 12 as a complete entity in a single molding process (except for the motors) in most instances.

The resulting structure in FIG. 12 for joint or manipulator 10' can be used to position manipulable support 32 therein anywhere over a wide angular range by forcing pivoting links 20 or 20' to selected rotational positions about the corresponding portion of base support 12 to which they are rotatably coupled by "living hinges" 12", 21 and 12", 21', respectively. The performance of such a joint or manipulator 10' can be made quite repeatable if the structural members, especially the "living hinges" used therein, are carefully made with materials exhibiting the same properties from batch to batch as well as carefully maintaining essentially identical dimensions from batch to batch in each unit made such as by use of precise laser cutting techniques. In addition, joint or manipulator 10' can be made exceeding small by using these methods, such as cutting the halves and forming the living hinges all by the use of lasers.

Although the present invention has been described with reference to preferred embodiments, workers skilled in the art will recognize that changes may be made in form and detail without departing from the spirit and scope of the invention.

The invention claimed is:

1. A controlled relative motion system permitting a controlled motion member, joined to another base member, to selectively move with respect to that base member, said system comprising:
   a base support;
   a first pivot holder comprising at least one holding member;
   a first plurality of pivoting links at least one of which is rotatably coupled to said base support so as to be rotatable about a corresponding base link axis and rotatably coupled to said first pivot holder so as to be rotatable about a corresponding holder link axis including at least one of said first plurality of pivoting links being rotatably connected to said holding member of said first pivot holder, each of said first plurality of pivoting links that is coupled to both said base support and said first pivot holder having said corresponding base link axis thereof extending in a direction differing from a direction in which said corresponding holder link axis thereof extends, each of said first plurality of pivoting links that is coupled to both said base support and said first pivot holder having said corresponding base link axis thereof and said corresponding holder link axis thereof extending in different directions than do said corresponding base link axis and said corresponding holder link axis of any other of said first plurality of pivoting links that is also coupled to both said base support and said first pivot holder, said first plurality of pivoting links each having an outer volume portion and an inner volume portion on either side of an intermediate plane, said intermediate plane containing both said base and holder link axes with said outer volume portion being closer than is said inner volume portion to a part of said base support that is on a side of said base link axis farther from said pivot holder over substantially the angular range of rotation thereof, said outer volume portion exceeding said inner volume portion; and
   a first plurality of force imparting members each coupled to either said first pivot holder or one of said pivoting links in said first plurality of pivoting links so as to be able to impart force thereto cause a least one of those said pivoting links in said first plurality of pivoting links to rotate about an axis therethrough.

2. The apparatus of claim 1 wherein said first pivot holder comprises at least two holding members each with a corresponding one of said first plurality of pivoting links rotatably coupled thereto about a corresponding holder link axis.

3. The apparatus of claim 1 wherein said first pivot holder has two of said first plurality of pivoting links each rotatably coupled thereto about a corresponding holder link axis.

4. The apparatus of claim 1 wherein one of said first plurality of pivoting links that is coupled to both said base support and said first pivot holder has said base link axis thereof and said holding link axis thereof each oriented substantially perpendicular to planes which intersect one another at substantially right angles.

5. The apparatus of claim 1 wherein each of said pivoting links in said first plurality of pivoting links is coupled to said base support so as to be rotatable about a corresponding base link axis and rotatably coupled to said first pivot holder so as to be rotatable about a corresponding holder link axis, and each of said base link axes of said pivoting links in said first plurality of pivoting links extends along a corresponding radius of a circle having a center within an outer surface envelope of said base support, and each said base link axis being separated from another such axis adjacent thereto by an angle substantially equal to 360(deg) divided by a number that is a total of said pivoting links in said first plurality of pivoting links.

6. The apparatus of claim 1 wherein each of said first plurality of said pivoting links coupled to said base support is rotatably coupled to said base support through having said pivoting link positioned in a corresponding slot in said base support with a pair of trunnions extending from opposite sides of that pivoting link to be rotatably coupled to said base support in slot side openings in said base support on either side of said slot such that rotation can occur by at least one of said base support and said pivoting link so coupled about an axis through said pair of trunnions.

7. The apparatus of claim 1 wherein each of said first plurality of pivoting links coupled to said base support is rotatably coupled to said base support through use of a hinge therebetween with said base support and said first plurality of pivoting links are formed from, and joined together by, a common material with said hinge being formed by a thinned portion of that material extending between said base support and each of said first plurality of pivoting links.

8. The apparatus of claim 1 wherein each of said first plurality of said pivoting links has said outer volume portion of said pivoting link extending primarily perpendicular to said intermediate plane.

9. The apparatus of claim 1 further comprising:
   a manipulable support; and
   a second plurality of pivoting links each rotatably coupled to said first pivot holder so as to be rotatable about a corresponding holder link axis and each rotatably coupled to said manipulable support so as to be rotatable about a corresponding support link axis including at least one of said second plurality of pivoting links being rotatably connected to said holding member of said first pivot holder, each of said second plurality of pivoting links having said corresponding holder link axis thereof extending in a direction differing from a direction in which said corresponding support link axis thereof extends, each of said second plurality of pivoting links having said corresponding holder link axis thereof and said corresponding support link axis thereof extending in different directions than do said corresponding holder link axis and said corresponding support link axis of another of said second plurality of pivoting links, said second plurality of pivoting links each having an outer volume portion and an inner volume portion on either side of an intermediate plane, said intermediate plane containing both said base support and holder link axes with said inner volume portion being closer than is said outer volume portion to a part of said base support that is on a side of said base link axis farther from said pivot holder over substantially the angular range of rotation thereof, said outer volume portion exceeding said inner volume portion.

10. The apparatus of claim 1 wherein a passageway is maintained through said base support and a passageway is maintained through said manipulable support such that an extended flexible material body sufficiently long and narrow can be positioned through each of said passageways.

11. The apparatus of claim 1 wherein at least one of said first plurality of force imparting members provides a rotational motive force.

12. The apparatus of claim 1 wherein said outer volume portion exceeds said inner volume portion by at least one and a quarter times.

13. The apparatus of claim 1 wherein that distance perpendicular to said intermediate plane between said intermediate plane and a part of said outer volume portion remotest therefrom exceeds that distance perpendicular to said intermediate plane between said intermediate plane and a part of said inner volume portion remotest therefrom by at least two times.

14. The apparatus of claim 2 wherein said first pivot holder further comprises a plurality of individual holding members which are free of any constraints connected directly therebetween, including said two holding members, and with a corresponding one of said first plurality of pivoting links each rotatably coupled to a corresponding one of said plurality of holding members about a corresponding holder link axis, said system further comprising:
   a manipulable support; and
   a second plurality of pivoting links each rotatably coupled to a corresponding one of said plurality of individual holding members so as to be rotatable about a corresponding holder link axis and each rotatably coupled to said manipulable support so as to be rotatable about a corresponding support link axis, each of said second plurality of pivoting links having said corresponding holder link axis extending in a direction differing from a direction in which said corresponding support link axis thereof extends, each of said second plurality of pivoting links having said corresponding holder link axis thereof and said corresponding support link axis thereof extending in different directions than do said corresponding holder link axis and said corresponding support link axis of another of said second plurality of pivoting links, said second plurality of pivoting links each having an outer volume portion and an inner volume portion on either side of an intermediate plane, said intermediate plane containing both said support and holder link axes with said inner volume portion being closer than is said outer volume portion to a part of said base support that is on a side of said base link axis farther from said pivot holder over substantially the angular range of rotation thereof, said outer volume portion exceeding said inner volume portion.

15. The apparatus of claim 5 wherein there are three said pivoting links in said first plurality of pivoting links.

16. The apparatus of claim 6 wherein said slots in said base support have a slot width separating slot side surfaces of said base support on either side of said slot, and a length along said slot side surfaces perpendicular to said width, with one of said slot side openings in said base support on either side of said slot extending into said base support from a corresponding one of said slot side surfaces having a groove in said base support inward from said slot intersecting said opening and extending parallel to said length of said slot, and with an opposite slot side surface being shaped to allow a corresponding one of said pivoting links in said first plurality of pivoting links that is initially positioned in a plane including a center of each of those slot side openings and at least a component of said length so that an end of said corresponding pivoting link having said pair of trunnions extending from opposite sides thereof positioned in said slot with one of said pair of trunnions in said groove is permitted through a subsequent rotation to be further inserted into said slot to result in said pair of trunnions being aligned with said centers of each of those slot side openings even though said pair of trunnions have those ends thereof separated by a distance greater than said slot width.

17. The apparatus of claim 6 wherein said first pivot holder further comprises a plurality of individual holding members which are free of any constraints connected directly therebetween and with a corresponding one of said first plurality of pivoting links each rotatably coupled to a corresponding one of said plurality of holding members about a corresponding holder link axis, and wherein each of said first plurality of said pivoting links coupled to a said individual holding member is rotatably coupled thereto through having said individual holding member positioned in a corresponding slot between two shackle arms in said pivoting link with a pair of trunnions extending from opposite sides of that holding member to be rotatably coupled to said pivoting link in slot side openings in said pivoting link on either side of said slot such that rotation can occur by at least one of said individual holding member and said pivoting link so coupled about an axis through said pair of trunnions.

18. The apparatus of claim 8 wherein each of said first plurality of said pivoting links has a further part of said outer volume portion extending primarily in a direction perpendicular to said direction of said primary extent of said outer volume portion.

19. The apparatus of claim 14 wherein each of said first plurality of pivoting links is rotatably coupled to a corresponding one of said plurality of individual holding members to which a corresponding one of said second plurality of pivoting links is also rotatably coupled to thereby have said holder link axes of such corresponding ones of said first and second pluralities of pivoting links share a common holder link axis plane, and wherein each of said first plurality of pivoting links, at that location where it is rotatably coupled to said base support, and that one said second plurality of pivoting links corresponding thereto, at that location where it is rotatably coupled to said manipulable support, are, at those locations, on opposite sides of said common holder link axis plane.

20. The apparatus of claim 14 wherein there are three said pivoting links in said first plurality of pivoting links.

21. The apparatus of claim 16 wherein said slot side openings in said base support on either side of said slot extending into said base support from a corresponding one of said slot side surfaces each extend through a portion of said base support to reach a corresponding access surface from which a corresponding bearing arrangement is insertable which, following such an insertion, rotatably couples said pair of trunnions of said corresponding pivoting link aligned with said centers of said slot side openings to said base support.

22. The apparatus of claim 17 wherein said slot between two shackle arms in said pivoting links have a slot width separating slot side surfaces of said shackle arms of said pivoting links on either side of said slot, and a length along said slot side surfaces perpendicular to said width, with one of said slot side openings in said shackle arms of said pivoting links on either side of said slot extending into a said shackle arm of said pivoting links from a corresponding one of said slot side surfaces having a groove in said shackle arm inward from said slot intersecting said opening and extending parallel to said length of said slot, and with an opposite slot side surface being shaped to allow a corresponding one of said individual holding members that is initially positioned in a plane including a center of each of those slot side openings and at least a component of said length so that an end of said corresponding individual holding member having said pair of trunnions extending from opposite sides thereof positioned in said slot with one of said pair of trunnions in said groove is permitted through a subsequent rotation to be further inserted into said slot to result in said pair of trunnions being aligned with said centers of each of those slot side openings even though said pair of trunnions have those ends thereof separated by a distance greater than said slot width.

23. The apparatus of claim 19 wherein there are three said pivoting links in said first plurality of pivoting links.

* * * * *

UNITED STATES PATENT AND TRADEMARK OFFICE
CERTIFICATE OF CORRECTION

PATENT NO. : 7,478,576 B2 Page 1 of 1
APPLICATION NO. : 11/391765
DATED : January 20, 2009
INVENTOR(S) : Mark E. Rosheim It is certified that error appears in the above-identified patent and that said Letters Patent is hereby corrected as shown below:

Column 1, Line 20, delete "effect or", insert --effector--

Column 10, Line 7, delete "of ten", insert --often--

Column 11, Lines 51-52, delete "termination-of", insert --termination of--

Column 14, Line 10, delete "of ten", insert --often--

Column 14, Line 47, delete "of ten", insert --often--

Column 15, Line 8, delete "of ten", insert --often--

Column 17, Line 65, delete "thereto cause a least", insert --thereto to cause at least--

Signed and Sealed this

Thirty-first Day of August, 2010

David J. Kappos
*Director of the United States Patent and Trademark Office*